(12) United States Patent
Bronstein et al.

(10) Patent No.: US 9,952,036 B2
(45) Date of Patent: Apr. 24, 2018

(54) SYSTEMS, METHODS, AND APPARATUSES FOR IMPLEMENTING MAXIMUM LIKELIHOOD IMAGE BINARIZATION IN A CODED LIGHT RANGE CAMERA

(71) Applicant: Intel Corporation, Santa Clara, CA (US)

(72) Inventors: Alexander Bronstein, Haifa (IL); Aviad Zabatani, Even Yehuda (IL); Ron Kimmel, Haifa (IL); Michael Bronstein, Lugano (CH); Erez Sperling, D.N. Menashe (IL); Vitaly Surazhsky, Yokneam Illit (IL)

(73) Assignee: INTEL CORPORATION, Santa Clara, CA (US)

( * ) Notice: Subject to any disclaimer, the term of this patent is extended or adjusted under 35 U.S.C. 154(b) by 220 days.

(21) Appl. No.: 14/934,599

(22) Filed: Nov. 6, 2015

(65) Prior Publication Data
US 2017/0131090 A1    May 11, 2017

(51) Int. Cl.
| H04N 15/00 | (2006.01) |
| G01B 11/22 | (2006.01) |
| H04N 13/02 | (2006.01) |
| H04N 5/33 | (2006.01) |
| H04N 13/00 | (2018.01) |

(52) U.S. Cl.
CPC .............. *G01B 11/22* (2013.01); *H04N 5/33* (2013.01); *H04N 13/0253* (2013.01); *H04N 13/0257* (2013.01); *H04N 2013/0077* (2013.01); *H04N 2013/0081* (2013.01)

(58) Field of Classification Search
CPC ....................................... G01B 11/22
USPC ......................................................... 348/46
See application file for complete search history.

(56) References Cited

U.S. PATENT DOCUMENTS

| 2015/0130932 A1* | 5/2015 | Vredenborg | A61B 5/1077 348/140 |
| 2016/0182889 A1* | 6/2016 | Olmstead | H04N 19/17 348/47 |

* cited by examiner

*Primary Examiner* — Richard Torrente
(74) *Attorney, Agent, or Firm* — Womble Bond Dickinson (US) LLP

(57) ABSTRACT

In accordance with disclosed embodiments, there are provided systems, methods, and apparatuses for implementing maximum likelihood image binarization in a coded light range camera. For instance, a depth camera is described having therein a projector to project a collection of planes, each at a different angle of projection, onto a scene via a plurality of coded pattern images, each of the coded pattern images having encoded therein via a plurality of stripes, the angle of projection for the plane of projection within which the respective coded pattern image is projected; a detector to capture the plurality of coded pattern images from the scene; a processing component to output a bit value for each pixel in the captured plurality of coded pattern images based on the pixel captured and based further on a patch of neighboring pixels surrounding the pixel; a decoder to decode each of the plurality of coded pattern images based on the bit values output by the processing component to determine the angle of projection for the corresponding plane of projection; and a triangulator to determine a position of an object in the scene based on an intersection of the determined angle of projection for the corresponding plane of projection with a geometric ray originating from the detector that detected the plurality of the coded pattern images. Other related embodiments are disclosed.

18 Claims, 12 Drawing Sheets

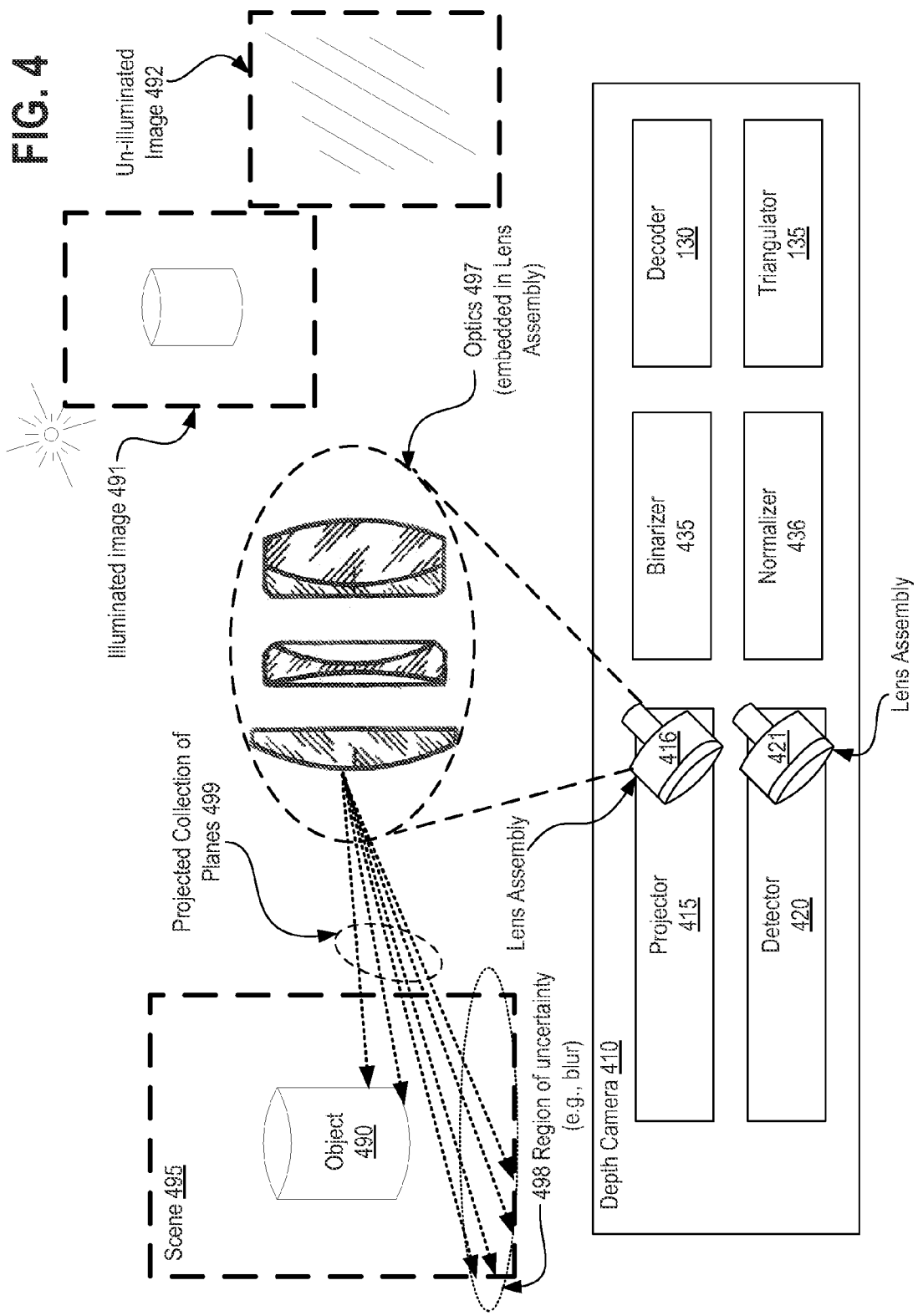

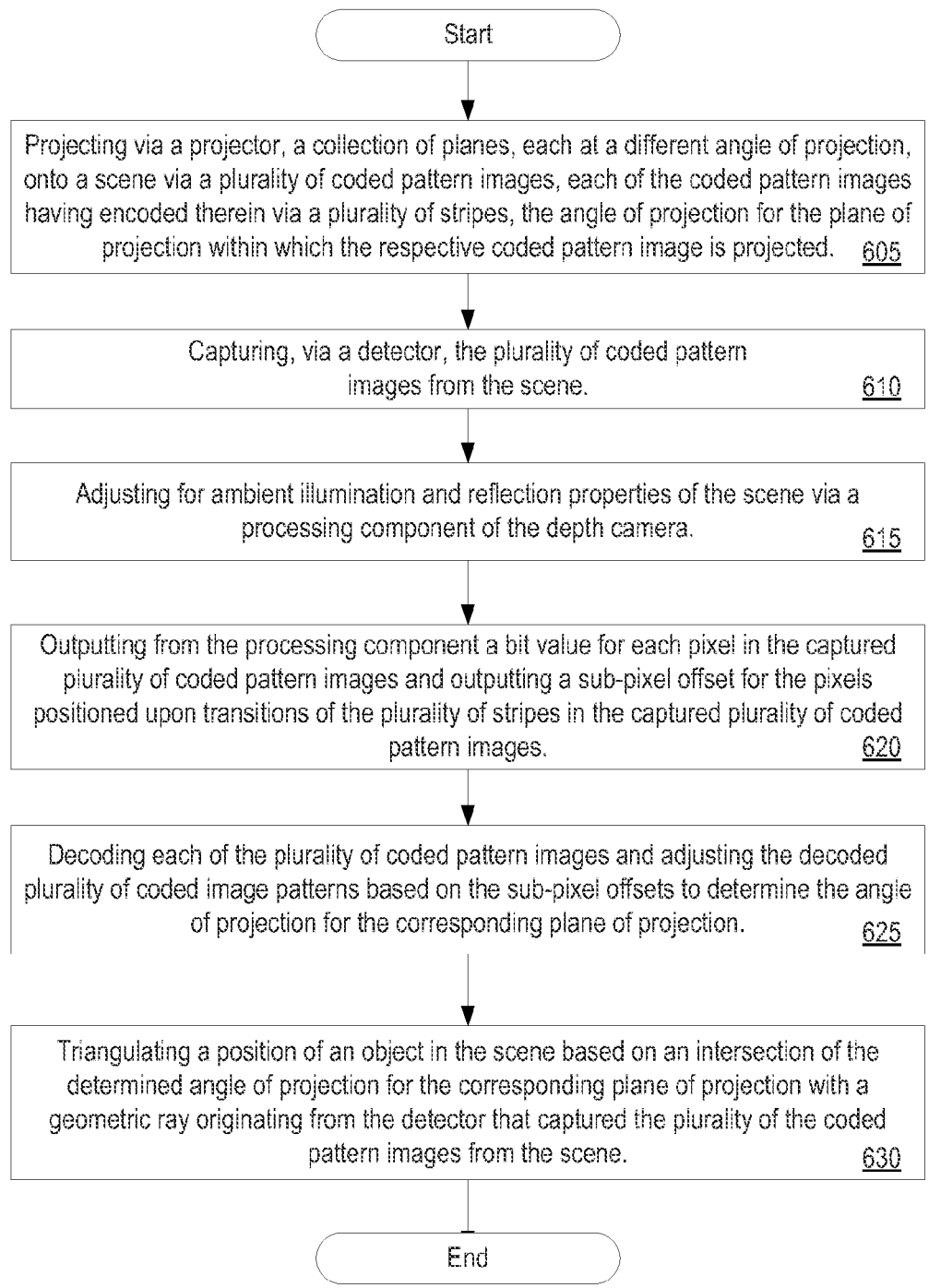

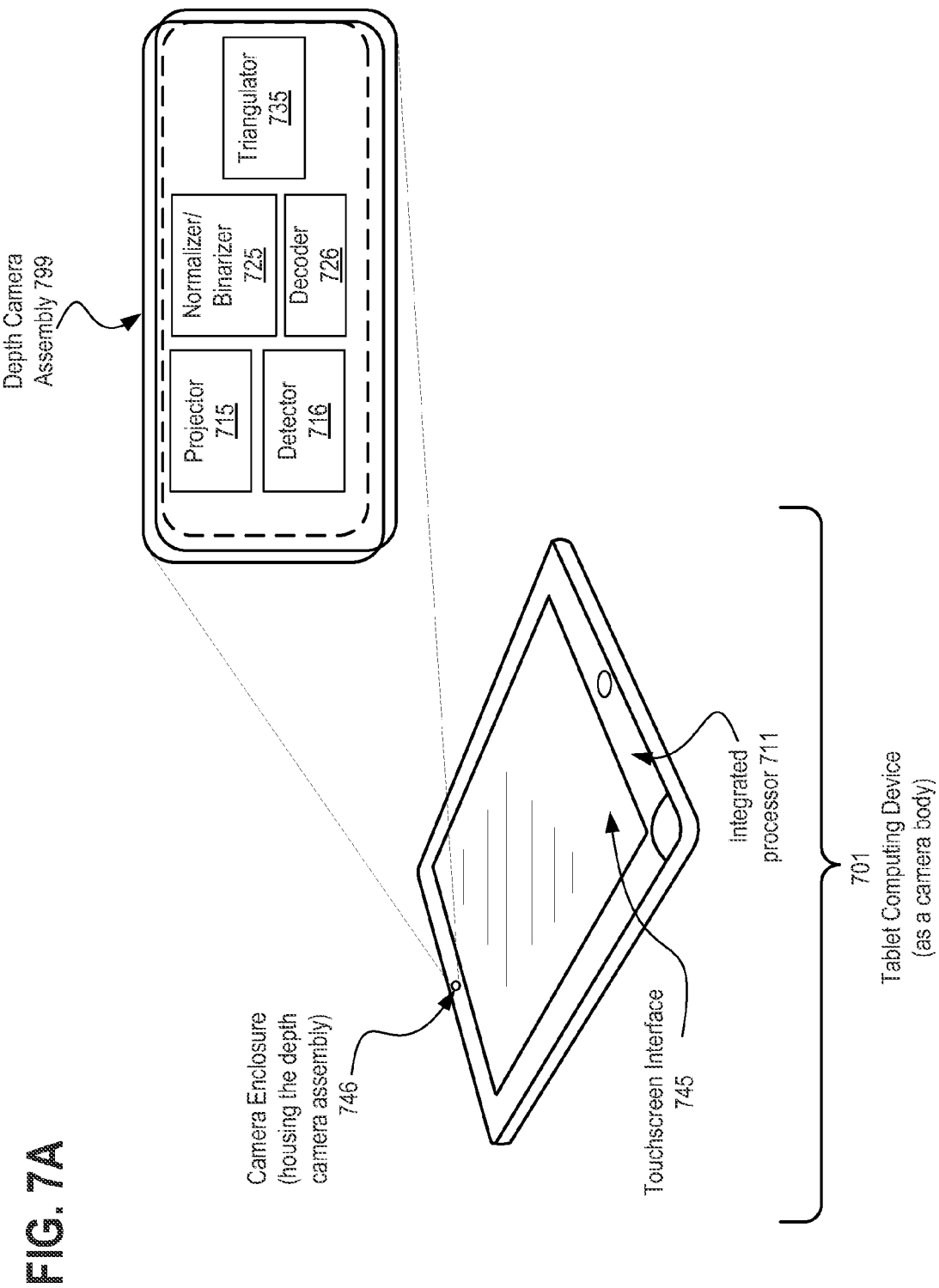

703

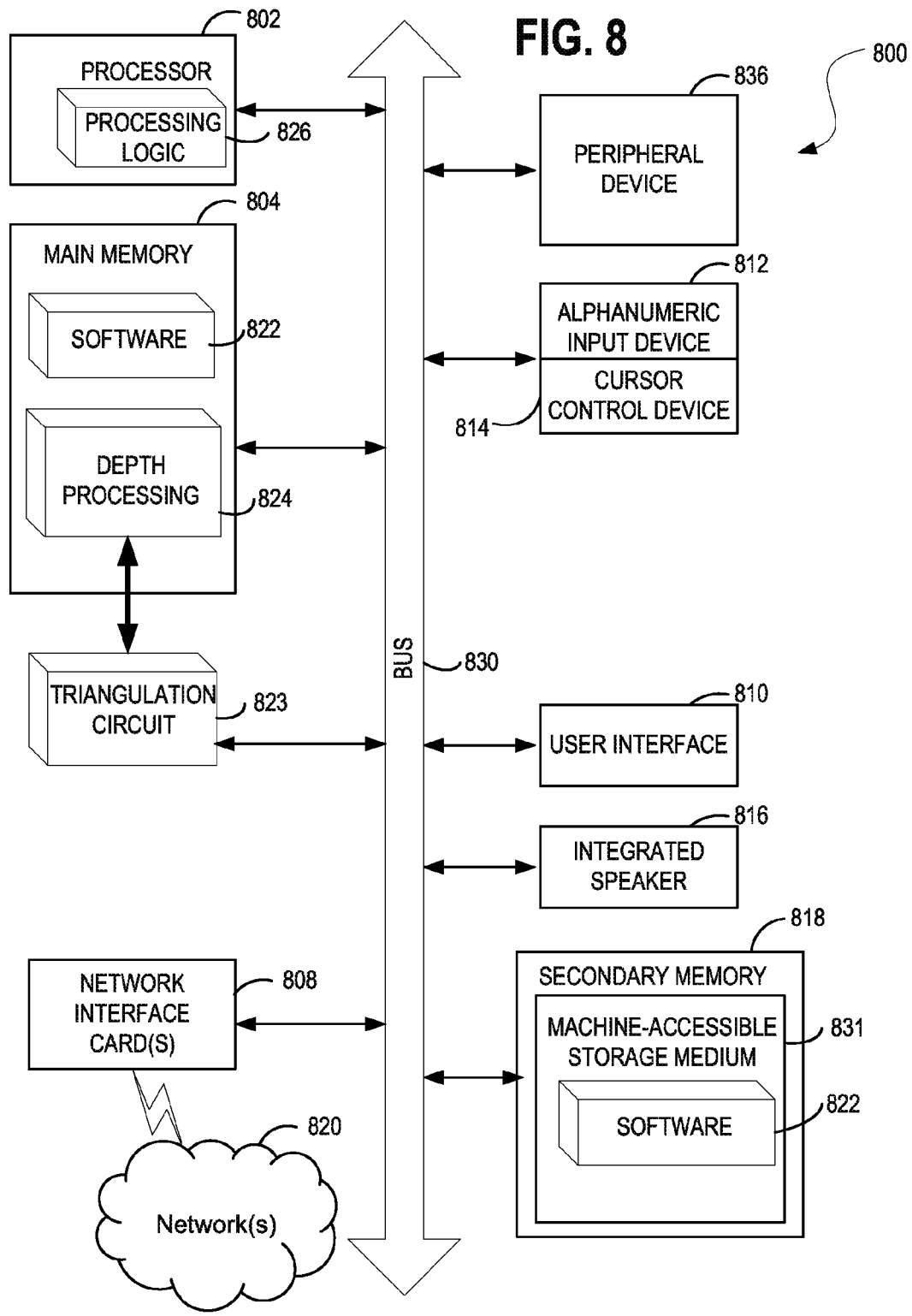

SYSTEMS, METHODS, AND APPARATUSES FOR IMPLEMENTING MAXIMUM LIKELIHOOD IMAGE BINARIZATION IN A CODED LIGHT RANGE CAMERA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of image capture devices such as cameras, and more particularly, to systems, methods, and apparatuses for implementing maximum likelihood image binarization in a coded light range camera.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Conventional cameras capture a single image from a single optical focal point and are enabled to capture pixels corresponding to an object in a scene, but in so doing, such cameras lose the depth information for where within the scene that object is positioned in terms of depth or distance from camera.

Conversely, stereo cameras have two or more lenses, each with a separate image sensor, and the two or more lenses allow the camera to capture three-dimensional images through a process known as stereo photography. With such conventional stereo cameras, triangulation is used to determine the depth to an object in a scene using a process known as correspondence. Correspondence presents a problem, however, of ascertaining which parts of one image captured at a first of the lenses correspond to parts of another image, captured at a second of the lenses. That is to say, which elements of the two photos correspond to one another as they represent the same portion of an object in the scene, such that triangulation may be performed to determine the depth to that object in the scene.

Given two or more images of the same three-dimensional scene, taken from different points of view via the two or more lenses of the stereo camera, correspondence processing requires identifying a set of points in one image which can be correspondingly identified as the same points in another image by matching points or features in one image with the corresponding points or features in another image.

This processing, however, is computationally intensive and therefore requires additional computing hardware to process higher quality imagery or necessitates a delay between image capture and correspondence processing completion from which the depth to an object may be determined and thus eliminates the possibility of real-time image processing as is required with moving video. Moreover, complexities are further introduced through variables such as movement of the camera, the elapse of time and/or movement of objects in the photos, variability in lighting conditions, and so forth. Still further, it may be that the scene from which the depth to an object is to be measured is nearly featureless, and as such, the correspondence processing cannot ascertain points which match to one another in the images. Consider for instance capturing images of a white wall or a featureless scene and trying to identify matching points within the scene. The correspondence processing will likely fail to identify sufficient correspondence points between the images thus making triangulation ineffective.

The present state of the art may therefore benefit from the systems, methods, and apparatuses for implementing maximum likelihood image binarization in a coded light range camera as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 4 illustrates another exemplary architecture in accordance with which embodiments may operate;

FIG. 6A is a flow diagram illustrating a method for implementing maximum likelihood image binarization in a coded light range camera in accordance with the described embodiments;

FIG. 7A illustrates an exemplary tablet computing device with a camera enclosure housing the depth camera assembly in accordance with described embodiments;

FIG. 8 illustrates a diagrammatic representation of a machine in the exemplary form of a computer system, in accordance with one embodiment.

DETAILED DESCRIPTION

Figure 1:
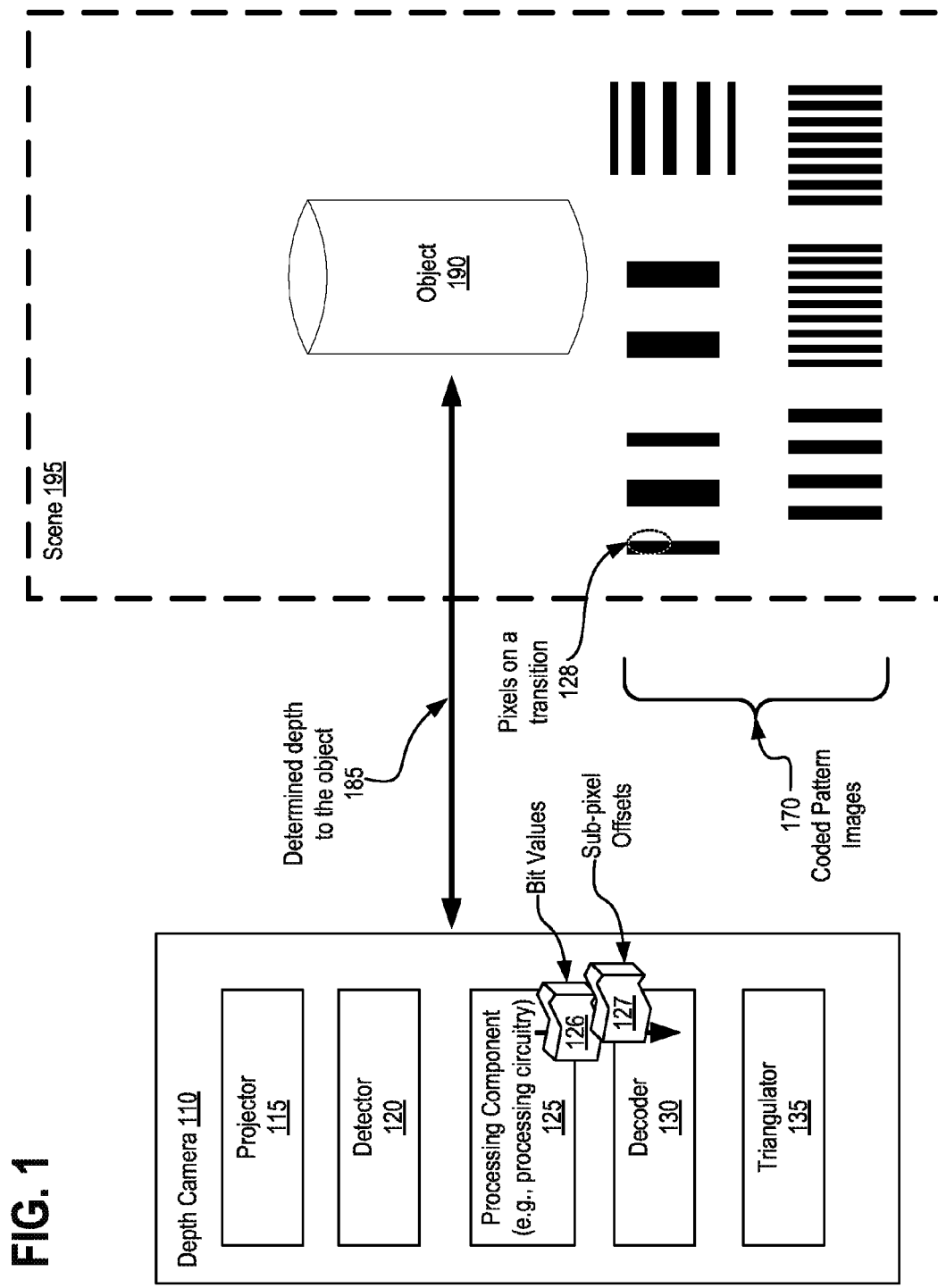
FIG. 1 illustrates an exemplary architecture in accordance with which embodiments may operate.

Described herein are systems, apparatuses, and methods for implementing maximum likelihood image binarization in a coded light range camera. For instance, a depth camera is described having therein a projector to project a collection of planes, each at a different angle of projection, onto a scene via a plurality of coded pattern images, each of the coded pattern images having encoded therein via a plurality of stripes, the angle of projection for the plane of projection within which the respective coded pattern image is projected; a detector to capture the plurality of coded pattern images from the scene; a processing component to adjust for ambient illumination and reflection properties of the scene; in which the processing component is to further output a bit value for each pixel in the captured plurality of coded pattern images and to output a sub-pixel offset for the pixels positioned upon transitions of the plurality of stripes in the captured plurality of coded pattern images; a decoder to decode each of the plurality of coded pattern images and to adjust the decoded plurality of coded image patterns based on the sub-pixel offsets to determine the angle of projection for the corresponding plane of projection; and a triangulator to determine a position of an object in the scene based on an intersection of the determined angle of projection for the corresponding plane of projection with a known ray emanating from the detector that detected the plurality of the coded pattern images from the scene.

It shall be understood that the term "ray" is in reference to the mathematical object and the term "ray" is not in reference to any projection (e.g., radiating light) by the depth camera, which are referred to herein as projections, coded pattern images, planes projected by the depth camera, etc. A ray is a half of a line, that is to say, a straight line starting at an initial point and extending to infinity in a direction and having no curvature, for which there is only one dimension, namely length, without width nor depth. As used herein, the mathematical object "ray" is therefore distinguished from a "beam" which is an optical term.

A single image of a scene captured via a single camera will have no depth information whatsoever for an object because given an imaginary ray originating from the focal point of the camera and extending to a point in the image, such as a pixel located on the object of the scene, it is impossible to determine where upon the ray that pixel is located, and thus, it is unknown where the object is positioned within the scene.

There is ambiguity therefore with respect to the position of the object in the scene. Triangulation enables the recovery of this depth information so as to identify the position of an object in a scene, by determining where two rays intersect, one from each of two stereo cameras.

Conventionally, depth cameras operated on the basis of correspondence-based triangulation from stereo cameras to estimate depth. Such conventional stereo cameras seek to determine a depth from the position of the camera to, ideally, every pixel of an object within a captured image. With such cameras, triangulation operates by calculating the intersection between two rays, each of the two rays originating from two different optical systems.

When an image is captured by such conventional cameras, it is necessary to compute correspondence for the pixels within the captured image before triangulation may be applied to determine depth, distance, or range to any given pixel of an object within the image.

There are multiple problems with such a conventional approach. One such drawback is the sheer computational intensity of computing correspondence. As image fidelity increases due to improvements in image capture technology the number of pixels in any given image increases dramatically. Such increases represent difficult processing demands in their own right, from the storage of the resulting image to the bus processing speed for which the data of a captured image may be taken from an image capture circuit and stored on non-transitory memory, necessitating that massive amounts of data be captured and stored in between every single still image or for every single frame of a moving image.

Such problems are only compounded when dealing with three-dimensional imagery. Correspondence calculations require identifying matching pixels for a given object in a scene amongst multiple captured images at the different optical systems, such that a subsequent triangulation operation may be performed. Conventional cameras which rely upon correspondence derived triangulation therefore are a legitimate and appropriate means by which to determine depth, but at great computational expense, which translates directly in to increased product costs due to the necessity to provide sufficient processing, memory, and bus technology within such a system.

Moreover, conventional systems utilizing correspondence derived triangulation suffer from a kind of depth blindness in the presence of a scene which is void of detail. Consider for instance such a conventional camera which captures left and right stereo images of a white wall. Such a system cannot calculate correspondence for such a featureless scene, and as such, is simply unable to perform the subsequent triangulation. Though a white while may be an extreme example, it is quite common for smaller areas of a captured scene to have portions that lack sufficient detail with which to compute correspondence, due to, for instance, lighting, distance, a lack of pixel density, and so forth, and this inability for such conventional cameras to compute correspondence for those sub-areas of the captured scene result in significant error in the depth computations and degradation of depth determining performance.

Therefore, the depth camera as is described herein introduces an active component into the scene to produce active stereo imagery or coded light imagery of the scene. Through this approach it is possible to remove one of the cameras and replace it instead with a projector. For instance, the projector may then be utilized to project one-dimensional code onto the scene, such as a sequence of patterns which may subsequently be captured by the remaining camera and decoded.

In accordance with one embodiment, the depth camera provides an active coded light triangulation system, utilizing an infrared (IR) projector, an IR camera, and a Red, Green, Blue (RGB) camera. Such a system may include coded light range cameras operating by projecting a sequence of one-dimensional binary ("black" and "white") patterns onto the scene, such that the produced binary code encodes the angle of the projection plane. The binarizer produces binary code bits from the projected sequence of the one-dimensional binary patterns, which the decoder then translates and correlates to an angle as per the encoded information, followed by the triangulator which reconstructs the depth by triangulating the intersection of a ray emanating from the camera with the now known angle of the plane emanating from the projector.

In certain embodiments, an image of the projected pattern is compared against a reference fully illuminated image and a reference fully un-illuminated image, and the corresponding bit of the binary code is computed at each pixel. There is a need to differentiate between black and white pixels for bit coding of a captured image, and detecting a sub-pixel transition between black and white pixels of those pixels which lie upon a transition, which allows the system to achieve higher depth reconstruction accuracy over those systems utilizing simple binarization based on a threshold which yields less accurate results as errors in the coding may result in significant accuracy loss in 3D depth estimation.

According to a particular embodiment, the system determines the pixel code of a pixel (e.g., whether the pixel is black or white) based on relative intensity of a group of neighboring pixels using a "template" of a transition as captured by the camera/detector. The template may be configured to take into account the point spread function of the projector, lens and camera. Using a matching score function, e.g., log likelihood taking into account various noise sources, the system determines a matching between an area around the pixel and an area of the template thus yielding superior range and better accuracy compared to conventional solutions which are based on point-wise binarization or correlation.

Improved systems and methods are described for performing the binarization process. For instance, in order to improve the signal-to-noise ratio, the binarization of a single pixel is based on a local environment of pixels, and the actual shape of the rising and falling edges of the template binary pattern while accounting for the projector and camera point spread function which is assumed to be known. The captured image of the pattern is normalized using the two reference images, the fully illuminated image and the fully un-illuminated image, in order to undo the surface reflection properties and angle and range-related attenuation. The value of the binarized pixel is computed by matching sub-pixel shifts of the template, possibly at slightly different orientations, to the normalized image, and selecting the shift producing the best match.

In such a way, a sub-pixel location of the pattern edge is calculated alongside with the binary image. In experiments, straightforward matching criteria such as correlation do not correctly account for the sources of noise present in a depth camera system, and in particular, fail to correctly account for Poisson-distributed shot noise of the sensor whose variance is proportional to the signal strength.

A more principled maximum likelihood estimator is therefore described herein to improve the estimations. In addition, likelihood values are utilized to compute the confidence of each pixel, in which the confidence is subsequently aggregated across the bit planes of the code and is used at the decoding stage.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled with a computer system bus. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 illustrates an exemplary architecture in accordance with which embodiments may operate. In particular, depicted are both a depth camera 110 and a scene 195, the scene 195 having an object therein, for which the depth camera 110 has determined the depth to the object 190 of the scene 195 as indicated by element 185.

Within depth camera 110 there is a projector 115, a detector 120, a processing component 125 (e.g., also referred to herein as processing circuitry which may include, for instance, one or more CPUs, memory, busses, FPGAs, etc.), a decoder 130, and a triangulator.

In accordance with a particular embodiment, such a depth camera 110 includes the projector 115 to project a collection of planes, each at a different angle of projection, onto a scene 195 via a plurality of coded pattern images 170, each of the coded pattern images 170 having encoded therein via a plurality of stripes, the angle of projection for the plane of projection within which the respective coded pattern image 170 is projected. The depth camera 110 further includes a detector 120 to capture the plurality of coded pattern images 170 from the scene 195 and a processing component 125 to adjust for ambient illumination and reflection properties of the scene 195.

According to such an embodiment, the processing component 125 is to further output a bit value 126 for each pixel in the captured plurality of coded pattern images 170 and additionally is to output a sub-pixel offset 127 for the pixels positioned upon transitions 128 of the plurality of stripes in the captured plurality of coded pattern images 170.

According to one embodiment, each sub-pixel offset 127 represents an amount of pixel shift relative to a center of the pixel for which the transition occurs between one of the plurality of stripes.

The depicted depth camera still further includes a decoder 130 to decode each of the plurality of coded pattern images 170 and to adjust the decoded plurality of coded pattern images 170 based on the sub-pixel offsets 127 to determine the angle of projection for the corresponding plane of projection.

The triangulator 135 of the depicted depth camera 110 is to determine a position of an object 190 in the scene 195 based on an intersection of the determined angle of projection for the corresponding plane of projection with a geometric ray originating from the detector 120 that detected the plurality of the coded pattern images 170 from the scene 195.

In accordance with such an embodiment, the processing component 125 outputs a bit value 126 for each and every pixel of the captured scene 195 and separately outputs the sub-pixel offsets 127 for only a sub-set of the pixels in the scene 195, and specifically, outputs the sub-pixel offsets 127 for those pixels which lie upon a transition 128 of one of the stripe which make up each of the coded pattern images 170. For instance, some of the pixels in the scene 195 will be entirely within or entirely upon one of the stripes, and as such, no sub-pixel offset 127 will be provided, although a bit value will be provided as bit values are provided for each and every pixel. Other pixels will positioned be entirely off of and away from the stripes which make up the coded pattern images 170, and thus, like the pixels positioned entirely upon a stripe, no sub-pixel offset 127 will be provided. Conversely, those pixels which bridge an edge or transition of any of the stripes, such that a portion of the pixel is located upon the stripe and a portion of the pixel is located off of the stripe, thus being a pixel on a transition 128, will have both a bit value 126 output by the processing component and additionally a sub-pixel offset 127 output by the processing component.

Figure 2:
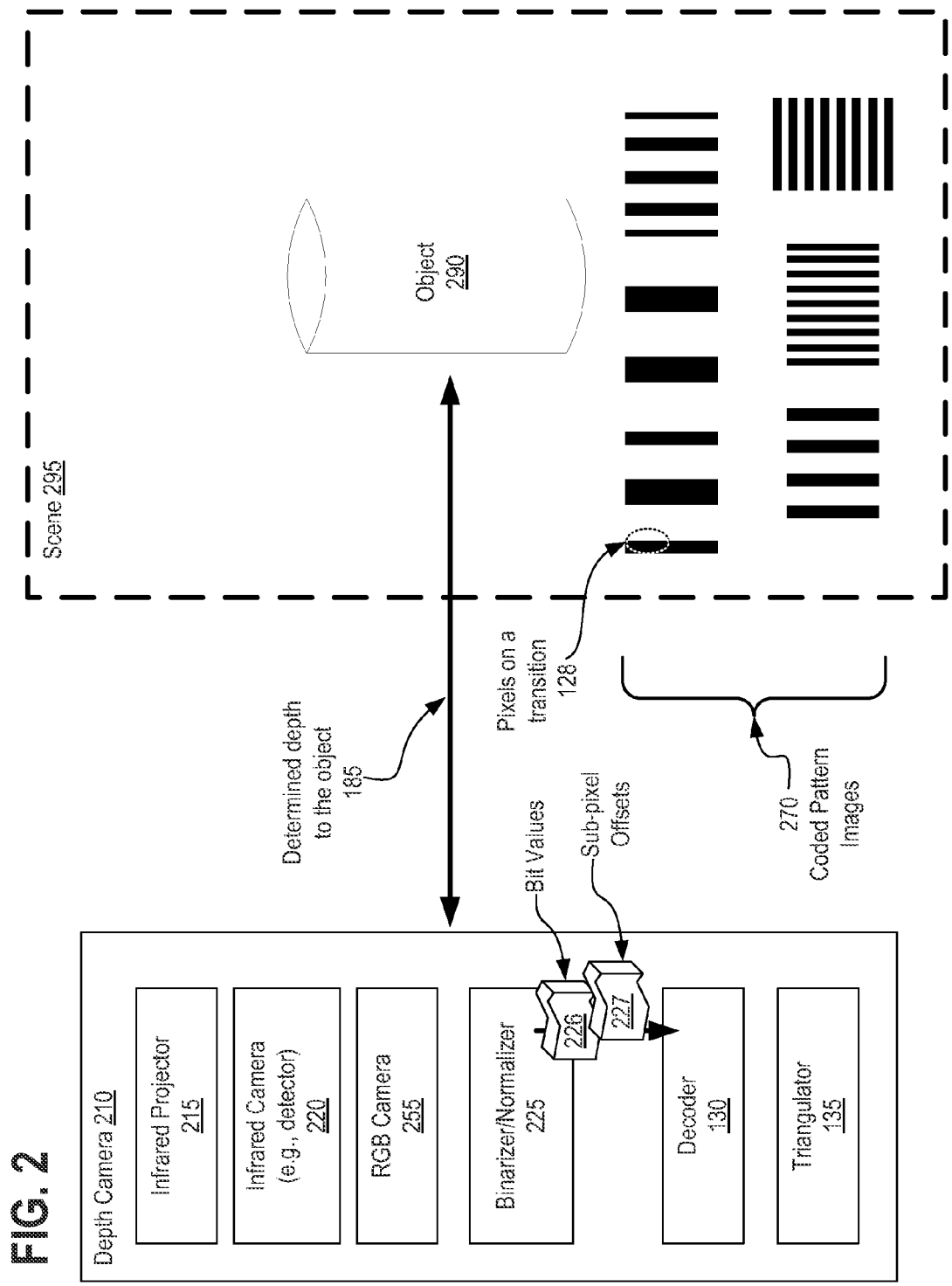
FIG. 2 illustrates another exemplary architecture in accordance with which embodiments may operate.

FIG. 2 illustrates another exemplary architecture in accordance with which embodiments may operate. In particular, depth camera 210 is depicted having specifically an infrared projector 215 to project the collection of planes onto the scene 295 using the plurality of coded pattern images 270 (via rows, columns, or both). In place of the previously described detector there is an infrared camera 220 which operates as a detector to detect the coded pattern images 270 from the scene 295.

As depicted here, the depth camera 210 further includes an RGB (Red, Green, Blue) camera in accordance with one embodiment. For instance, in such an embodiment, the projector of the depth camera is an infrared 215 to project the collection of planes onto the scene in an infrared light range and the detector is an infrared camera 220 to capture the plurality of coded pattern images from the scene in the infrared light range and the depth camera further includes an RGB camera 255 to capture RGB images of the scene in a visible light range.

Further depicted is a binarizer/normalizer 225 having processing circuitry therein to normalize for lighting conditions of the scene and to binarize and output the bit values 226 for the pixels of the scene and the sub-pixel offsets 227 for those pixels which lie upon a transition of one of the plurality of stripes in the captured plurality of coded pattern images 270.

Each plane is projected onto the scene 295 at a different angle. If the angle of each plane projected on to the scene 295 or as projected onto the object 290 of the scene is known, then it is possible to mathematically derive the position of the object 290 in the scene 295 based on the intersection between the ray originating at the detector of the depth camera and the projected plane.

However, it is necessary to encode the angle or position of the intersecting plane within the scene 295; hence the use of the stripes of the coded pattern images 270 which take the form of a binary code, referred to as "Gray code" or "Gray patterns." Both rows and columns may be utilized to form the coded pattern images 270 via the stripes.

Thus, it is according to described embodiments, the projector projects one-dimensional code onto the scene via a sequence of patterns that are subsequently captured by the detector 120 or infrared camera 220 and decoded by the decoder 130.

In accordance with one embodiment, the projector which is to project the plurality of coded pattern images onto the scene operates within the non-visible light range utilizing both an infrared projector 215 to project the plurality of coded pattern images in the form of 1-dimensional stripes for each of the coded pattern images, the 1-dimensional stripes projected within the plurality of coded pattern images corresponding to a multi-bit binary code projected by the infrared projector.

According to another embodiment, the multi-bit binary code constitutes an N-bit Gray code projected by the infrared projector 215 via N coded pattern images 270, the most significant bit of the N-bit Gray code projected as the 1-dimensional stripes within a first of the N coded pattern images and a least significant bit of the N-bit Gray code projected as the 1-dimensional stripes within a last of the N coded pattern images 270.

According to one embodiment, any single pixel position captured from the plurality of coded pattern images 270 projected onto the scene 295 corresponds to a sequence of 0s or 1s in the N-bit Gray code based on the pixel being illuminated or un-illuminated within the scene at the single pixel position during each of the plurality of coded pattern images captured.

Figure 3:
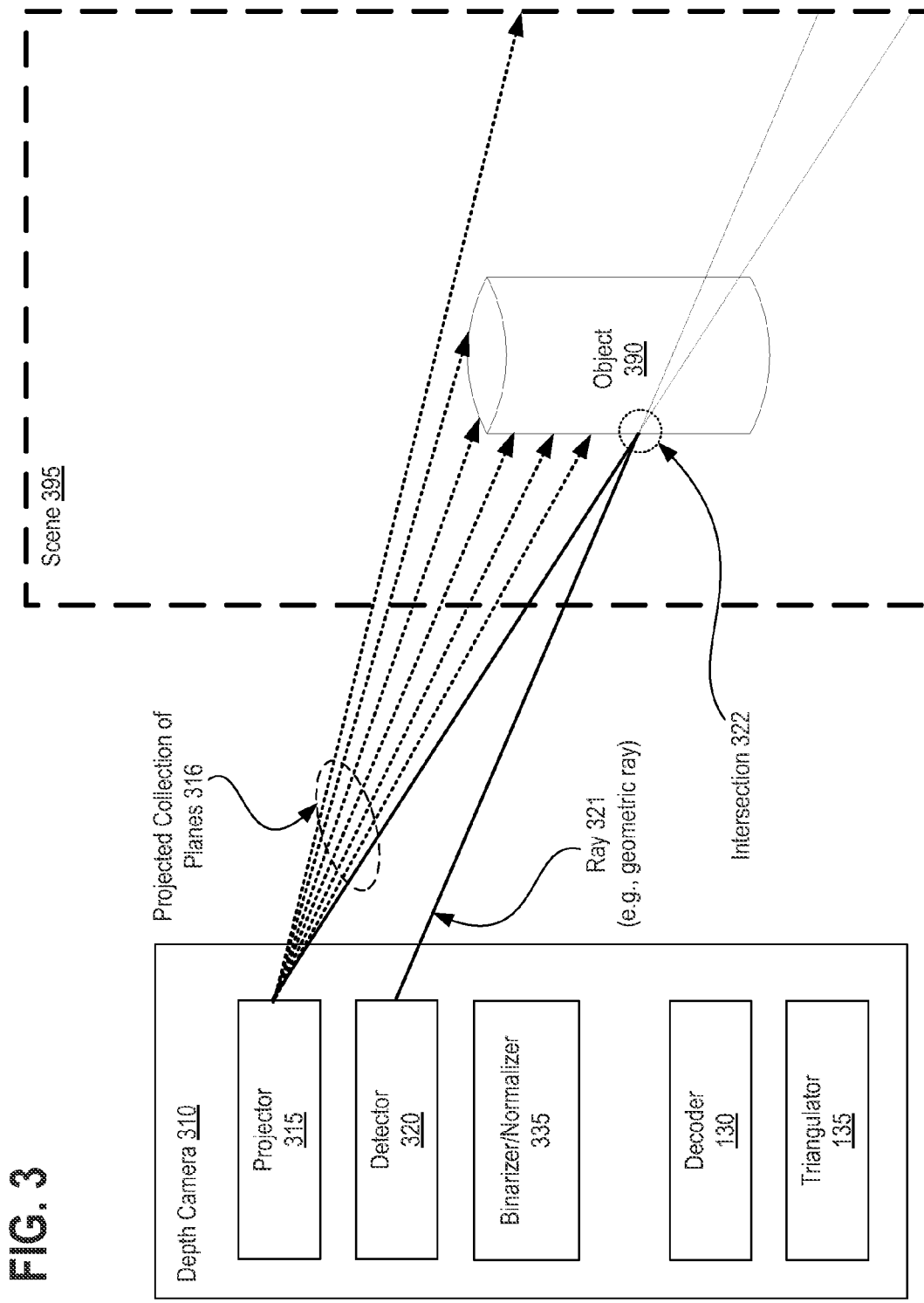
FIG. 3 illustrates another exemplary architecture in accordance with which embodiments may operate.

FIG. 3 illustrates another exemplary architecture in accordance with which embodiments may operate. In particular, depth camera 310 is depicted having specifically the projector 315 to project the collection of planes 316 onto the scene 395 using the plurality of coded pattern images and a detector 320 to detect the coded image patterns from the scene 395.

According to a particular embodiment, the decoder 130 is to determine which plane 316 the point of an object 390 is lying within the scene 395 based on a sequence of 0s or 1s in a N-bit Gray code projected onto the scene 395 as 1-dimensional stripes within the N coded pattern images. For instance, in such an embodiment, the triangulator 135 is to determine the position of the object 390 in the scene by an intersection 322 of the determined plane 316 with the geometric ray 321 originating from the detector that detected the plurality of the coded pattern images from the scene 395. In such an embodiment, the position of the object 390 in the scene 395 is determined without computing correspondence between the plurality of coded pattern images projected onto the scene by the projector 315 and the plurality of coded pattern images captured from the scene by the detector 320.

In accordance with one embodiment, the projector 315 is to project the plurality of coded pattern images onto the scene constitutes an infrared projector to project one dimensional code onto the scene via a sequence of coded patterns to be captured by the infrared detector and decoded by the decoder 130 to determine the angle of projection for each of the collection of planes which the triangulator 135 receives as an input to triangulate intersections 322 between the planes of the projected plurality of coded pattern images on the scene with the geometric ray 321 originating from the infrared detector which is to capture the plurality of coded pattern images on the scene and further in which the one dimensional code specifies the angle of projection for each plane of the collection of planes projected onto the scene by the projector 315.

As noted above, the projector 315 (whether infrared or otherwise) uses coded light to encode the angles of each of the collection of planes projected onto the scene via the coded pattern images. The coded light provides a series of one dimensional stripes that look like an N-bit binary code.

Take for example an 8-bit code to be projected onto the scene. The projector 315 projects eight such patterns, one for each bit of the code, each of the patterns projected onto the scene encoding one bit, starting from most significant bit to the least significant bit of the exemplary 8-bit binary code. Depending on the position of the object 390, there is a sequence of zeros and ones (0s and 1s), determinable based on whether any given pixel is an illuminated pixel or an un-illuminated pixel.

According to one embodiment, the depth camera of includes a binarizer/normalizer 335 as implemented by processing circuitry or the processing component as depicted at FIGS. 1 and 2. In such an embodiment, the normalizer and binarizer units 335 reduce noise and interference in the plurality of coded pattern images captured by the detector before the triangulator 135 determines the position of the object 390 in the scene. In such an embodiment, the normalizer and binarizer units 335 further convert the plurality of coded pattern images into binary information, the binary information specifying at least the angle of projection for each plane in the collection of planes projected onto the scene as adjusted by the decoder 130 based on the sub-pixel offsets 127, as depicted at FIGS. 1 and 2.

Extracting the sequence of bits from the 8-bit code projected onto the scene the binarizer 335 in conjunction with the decoder 130 is able to identify on which of the projected collection of planes 316 any given point on the object 390 lies and by intersecting 322 that plane with a ray 321 originating at the focal point of the detector 320, the position and depth of that point, and thus the position of the object 390, is determinable via the triangulator 135.

In accordance with another embodiment, the triangulator 135 is to determine a distance from the depth camera to every one of a plurality of pixel locations on the object 390 as captured by the detector 320 based on the intersection 322 between the plane at the determined angle of projection within which the pixel location on the object is captured and the geometric ray 321 originating from the detector at the same location. In such an embodiment, the position of the object 390 in the scene is found in 3-dimensional space relative to the depth camera based on the determined distance to the plurality of pixel locations on the object determined by the triangulator 135.

In accordance with one embodiment, the triangulator 135 which is to determine the position of the object in the scene constitutes the triangulator determining the position of the object 390 in the scene 395 without computing correspondence between the plurality of coded pattern images projected onto the scene by the projector 315 and the plurality of coded pattern images captured from the scene by the detector 320.

Because the intersection 322 is determined for the point between an identified projected plane and the intersecting 322 ray 321 from the detector 320, it is not necessary to compute correspondence for pixels of multiple focal point images, and thus, the process is significantly less computationally intensive and thus much faster in terms of processing time and responsiveness, especially in consumer oriented platforms for which battery consumption, heat, and the cost of processing components is a significant area of concern for manufacturers and retailers.

The binarizer 335 then proceeds to decode the information by determining, for each pixel captured by the detector 320, whether the sequence of stripes represented a 1 or a 0 so as to output the appropriate bit-value for that pixel.

FIG. 4 illustrates another exemplary architecture in accordance with which embodiments may operate. In particular, depth camera 410 is depicted having specifically the projector 415 to project the collection of planes 499 onto the scene 495 using the plurality of coded pattern images and a detector 420 to detect the coded image patterns from the scene 495. The projector 415 includes lens assembly 416 having optics 497 embedded therein and detector 420 includes lens assembly 421, also having optics embedded therein, although not depicted here.

Given the exemplary 8-bit code, there are 256 different planes encoded onto the scene. Around every one of the collection of planes projected onto the scene there exists some uncertainty. Take for example, a field of view of 64 degrees and by dividing the field of view approximately equally there will be a resulting 256 different regions, each with an uncertainty of plus or minus 0.25 degrees. For this area of uncertainty there are a finite number of bits for the code. Estimating depth even just a few meters from the camera becomes increasingly problematic due to the lack of resolution in which the angle of the plane is inflated or magnified by a factor of several thousand. Due to the manner of triangulation for the intersections described above, the calculations are very sensitive to errors in the position of the plane. Also depicted are the binarizer 435 and normalizer 436.

According to one embodiment, the binarizer 335 of the processing component estimates positions of transition from 0 to 1 and 1 to 0 for the plurality of coded pattern images in a sub-pixel range of the detector 320 where the transitions occur for the pixels positioned upon any of the plurality of stripes in the captured plurality of coded pattern images. In such an embodiment, the estimated positions provide a higher resolution of the captured coded image patterns than is encoded by the values alone of the plurality of stripes.

According to another embodiment, the binarizer 335 determines a binary value for each pixel captured by the detector 320 within the plurality of coded pattern images and outputs the bit value for each pixel. In such an embodiment, the binarizer 335 further determines the pixel shift for each pixel having a transition from 0 to 1 or 1 to 0 in the plurality of coded pattern images, in which the pixel shift represents a shift relative to a center of the pixel having the transition. The binarizer 335 further outputs the sub-pixel offset for the pixels positioned upon transitions of the plurality of stripes in the captured plurality of coded pattern images and provides the binary value for each pixel and the determined pixel shifts as an input to the decoder 130.

According to a particular embodiment, the resolution of depth information in a subset of pixels of each projected coded pattern image is proportional to angular resolution of the detector and is independent from the quantity of bits encoded within the plurality of coded pattern images.

Stated differently, the resolution of depth information in the subset of the output image does not depend on the number of code bits. Rather, greater resolution of depth information is derived from an increased angular resolution of the detector without a corresponding increase in a quantity of bits encoded within the plurality of coded pattern images projected by the projector.

Depth resolution may therefore be improved beyond that which is feasible through projected bit code when taken alone. For instance, at infinite resolution the plurality of coded pattern images projected onto the scene appear as a step function from zero to one and from one to zero. Notwithstanding the blur 498, each bit may be escalated at the position of transitions from zero to one or from one to zero with sub-pixel resolution which is much more accurate than that which is yielded by the bit values for each one of the pixels alone. Greater resolution is thus determinable for at least portions of the image. Thus, for each pixel, not only is the bit value output, but for those pixels located or positioned upon where the transitions occur, there is also output some value of pixel shift with respect to, for example, the pixel center. This information, the bit value and the pixel shift for those pixels on a transition, is then fed to a processing component through a pipeline and on to a triangulator which then determines the position and depth information for the object in the scene.

Conversely, if the depth camera were to be limited by the number of bits actually projected via the plurality of coded image patterns, then every bit required to communicate information, such as the angle of projection, requires that another pattern be projected onto the scene, which therefore requires projection and detection time to convey and capture the information which then in turn induces additional sensitivity to movement and motion within the scene, for instance, due to lower permissible frame rates, due to the increased demand on projecting and detecting the coded image patterns from the scene. These additional projection and detection times are overhead and thus detract from the underlying content that a user is actually interested in seeing.

Therefore, other camera solutions which use active coded light technology are extremely limited by the number of bits they are able to project. With a high resolution camera the resolution of depth information using conventional techniques is thus limited by the projected bit information whereas utilizing the techniques described herein, including providing the pixel shift information in the sub-pixel range for those pixels which lie upon a transition, the resolution of depth information is greatly enhanced by the pixel size of the high resolution camera and is not limited by the number of bits projected by the projector.

In accordance with certain embodiments, optics 497 of the projector 415 or the detector 420, or both the projector and the detector, at least partially blur 498 the projected collection of planes 499 at the edges of each plane. In such an embodiment, a binarizer 435 of the processing component adjusts for the blur 498 prior to the triangulator 135 determining the position of the object 490 in the scene 495.

The normalizer 436 does not undo the blur, but rather, it undoes the ambient light and the reflection coefficient of the scene 495, known as "albedo," which are unknown to the normalizer 435 in advance. To adjust for the blur 498 at the edges of each of the collection of planes within the region of uncertainty, the overall point spread function of the entire optical 497 system including the projector 415 and the detector 420 is made part of the templates.

In an alternative embodiment, blur 498 is accounted for at the binarizer 435 and is not based on the reflection coefficients and ambient light. The binarizer 435 operates to attain a higher resolution of the code at those points within the region of uncertainty than would otherwise be feasible through the number of code bits alone.

According to one embodiment, a quantity of illumination in each pixel in the projected and captured coded pattern images is unknown in advance and is based on a yet to be determined distance to the pixel at the object 490, unknown reflection characteristics of the object at the pixel's position on the object, and unknown ambient illumination. In such an embodiment, a normalizer 436 of the processing component compensates for the unknowns based on a comparison of projected and captured coded pattern images to a projected and captured fully illuminated image and a captured un-illuminated image having only the ambient light of the scene present therein.

According to another embodiment, a first reference image of all 1s for every pixel is established from the projected and captured fully illuminated image 491 and a second reference image of all 0s for every pixel is established from the captured un-illuminated image 492 having only the ambient light of the scene present therein. In such an embodiment, the normalizer 436 is to determine an offset illumination of each pixel from the first reference image, and determine the code amplitude from the difference in illumination between the first and second reference images and further in which the normalizer 436 is to normalize the captured coded pattern images by subtracting the offset from every pixel of the captured coded pattern images and dividing the result by the code amplitude for every pixel of the captured coded pattern images.

Resolution decreases as the distance to the object increases because the amount of light reflected decays as the square of the distance to the object and due also to the reflection properties including the reflective coefficient, called albedo, the amount of light the object reflects back. Additionally complicating the matter is the manner by which the light is reflected back, with one extreme being a mirrored reflection versus the reflective properties of a white piece of paper, resulting in diffuse reflection. In reality, objects within the scene will reflect light back to the depth camera somewhere in between the two extremes, causing the code projected onto the scene to modulate according to the unknown reflection characteristics of the scene and the objects present in the scene.

Projecting a fully illuminated frame provides two reference frames from which the system may normalize all the rest of the coded pattern images by subtracting the offset due to the ambient illumination dividing by the distance between zero and one in every pixel in order to adjust for the ambient lighting and reflection characteristics of the objects in the scene.

Signal Formation Model:

According to the described embodiments, use of the fully illuminated image and the fully un-illuminated image constitute a signal formation model defined as follows:

Let $I_0$ and $I_1$ denote the un-illuminated (dark) image and fully illuminated (white) images, respectively and let $I_p$ be the image of the known projected pattern. For each pixel in I, determine whether the pattern was black (0) or white (1) at that location. If the transition from 0 to 1 (a rising edge) or from 1 to 0 (a falling edge) occurs at that pixel, a sub-pixel estimation of the transition location shall be calculated. Translating each of the three images denoted collectively as $I_*$ with * representing the 0, 1, or p from DN to photoelectrons according to: $Y_*(x) = \gamma \max\{I_*(x) - dc, 0\}$, where dc is the known sensor A/D offset and where $\gamma$ is the known pixel convergence gain. This translation is required since unlike $I_*$, $Y_*$ admit Poisson statistics.

The un-illuminated image can be modeled as: $Y_0(x) = C(x) + N(x)$ where $C(x)$ is the contribution of the ambient illumination having Poisson distribution with the rate $\lambda_{amb}$, and N is stationary zero-mean random noise due to pixel dark current, quantization, and read-out. Both noises are approximated as Gaussian, having: $Y_0(x) \approx \lambda_a(x) + N(0, \sigma^2 + \lambda_a(x))$, statistically independent at different pixels, with $\sigma^2$ denoting the variance of N.

The fully-illuminated image has the same contribution of the ambient, to which the contribution of the projected signal is added: $Y_1(x) = A(x) + N(x)$ where: $A(x)$ has Poisson distribution with the rate: $\lambda_a + \lambda_p(1+S)$, S being a zero-mean noise modeling the laser speckle which is static in time but varying in space, and in which N is additional system noise as $Y_0$.

As before, all noises are approximated as Gaussian, yielding:

$$Y_1(x) \approx \lambda_a(x) + \lambda_p(x) + N(0, \sigma^2 + \lambda_a(x) + \lambda_p(x) + v^2 \lambda_p^2(x)),$$

with $v^2$ representing the variance of the speckle noise.

The pattern image is formed similarly to $Y_1$ with the exception that the projector contribution is modulated by the projected pattern $P(x)$ normalized between 0 (no illumination) and 1 (full illumination), yielding:

$$Y_p(x) \approx \lambda_a(x) + \lambda_p(x) P(x) + N(0, \sigma^2 + \lambda_a(x) + \lambda_p(x) P(x) + v^2 \lambda_p^2(x) V^2(x)).$$

Depth determination is sensitive to noise, and thus, the system adjusts for a variety of noise sources as detailed above. Therefore, in accordance with one embodiment, a binarizer 435 of the processing component is to adjust for noise in the captured coded pattern images before the triangulator determines the position of an object 490 in the scene 495.

According to one embodiment, the binarizer 435 is to adjust for noise selected from one or more of the following noise types: shot noise or counting noise resulting from a photon hitting a pixel and depositing charge with the pixel at an uncertain probability according to Poisson distribution in which the variance increases with the code amplitude; noise originating from circuitry of the detector due to quantization of the captured coded pattern images into a digital signal, wherein the noise is invariant with the strength of the signal; and speckle noise originating from a light source of the infrared projector creating interference patterns via coherent illumination of the scene.

According to one embodiment, the binarizer 435 is to output the bit value for each pixel in the captured plurality of coded pattern images. In such an embodiment, the binarizer further determines a confidence value for each pixel and aggregates the confidence value of each pixel across each of the plurality of coded pattern images projected in the collection of planes and in which the decoder then receives as input the aggregated confidence value determined for each pixel and decodes the plurality of coded pattern images based at least in part on the aggregated confidence values.

Maximum Likelihood Estimation:

In a particular embodiment, likelihood values are used to compute the confidence of each pixel, the confidence values of the pixels being subsequently aggregated across the bit planes of the code used at the decoding stage, as follows:

Let pixel location x be fixed, dropping the dependence on it for convenience of notation, and further assume that $\lambda_a$ and $\lambda_p$ are known, although in practice, their estimates are likely to be provided.

Given the measurement $y = Y_p(x)$, the log-likelihood of $P \in [0,1]$ being the projected pattern $P(x)$ is given by:

$$L(y \mid P) = \log P(Y_p = P) = const - \frac{(\lambda_a + \lambda_p P - y)^2}{2(\sigma^2 + \lambda_a + \lambda_p P + v^2 \lambda_p^2 V^2)}.$$

According to one embodiment, the normalizer 436 is to estimate the values of the ambient signal $\lambda_a$ and the signal amplitude $\lambda_p$ for each pixel based on a patch of neighboring pixels surrounding the pixel.

In order to estimate $\lambda_a$ and $\lambda_p$, assume that these two parameters are approximately constant in a patch P around x, and estimate them by averaging:

$$\hat{\lambda}_a = \frac{1}{|P|} \sum_{x \in P} y_0(x),$$

where $y_*(x)$ denotes the measurements of the random variables $Y_*(x)$. Similarly, $$\hat{\lambda}_p = \max\left\{ \frac{1}{|P|} \sum_{x \in P} (y_1(x) - y_0(x)), 0 \right\}.$$

Using these estimates, the log likelihood of observing the patch of y given the pattern P is:

$$L(y \mid P) = \sum_{x \in P} \frac{(\hat{\lambda}_a + \hat{\lambda}_p P(x) - y(x))^2}{\sigma^2 + \hat{\lambda}_a + \hat{\lambda}_p P(x) + \hat{\lambda}_p^2(v^2 V^2(x) + \eta^2)},$$

where the variance parameter $\eta^2$ is added to account for model noise stemming from inaccuracies in the modeling of the actual projected pattern.

According to one embodiment, the binarizer 435 is to output the bit value for each pixel in the captured plurality of coded pattern images and the binarizer further determines the bit value of each pixel based on a patch of neighboring pixels surrounding the pixel by selecting one of a plurality of patch templates which matches the patch of neighboring pixels with a better resilience to noise and the binarizer then outputs the bit value for each pixel in the captured plurality of coded image patterns based on the selected one patch template for the pixel.

For instance, the binarizer may select one of a plurality of patch templates $P(x)$ which matches the patch of neighboring pixels $y(x)$ based on which of the templates provides a greatest degree of accuracy or a determined accuracy over a pre-determined threshold or a determined improvement in noise over a threshold.

According to one embodiment, the binarizer 435 is to compute a sum of the squared differences based on a difference between the pixels in each patch in the plurality of coded pattern images captured from the scene and the pixels in each of the plurality of template patches, $$\sum_{x \in P} w(x)(\hat{\lambda}_p P(x) - y(x))^2,$$

where terms or the sum of the squared differences are weighted by weights $w(x)$ based on signal strength to identify which one of a plurality of templates matches a patch of neighboring pixels with a greatest degree of accuracy; and further in which the binarizer is to output the bit value for each pixel in the captured plurality of coded image patterns based on the selected one patch template for the pixel.

According to one embodiment, the binarizer 435 is to compute a weighted correlation $$\sum_{x \in P} w(x) P(x) y(x),$$

based on a sum of products between the pixels in each patch in the plurality of coded pattern images captured from the scene and the pixels in each of the plurality of template patches, wherein terms of the sum of the products are weighted by weights w(x) based on signal strength to identify which one of a plurality of templates matches a patch of neighboring pixels with a greatest degree of accuracy; and further in which the binarizer is to output the bit value for each pixel in the captured plurality of coded image patterns based on the selected one patch template for the pixel.

Mathematically, the computation of the sum of the squared differences and the computation of the weighted correlation based on a sum of products between the pixels are similar, but not identical, and each may provide certain benefits over the other for any given implementation.

Maximum Likelihood (ML) Binarizer:

Binarization of $Y_p$ based on the maximum likelihood estimator described above is performed as follows:

First, the knowledge of the projected pattern is assumed (a one-dimensional code), which is expressed by two one-dimensional functions $p^\pm(x)$ with the transition (respectively, rising and falling edges) located exactly at x=0. A parametric family of two-dimensional templates is formed by letting for each pixel x=(x,y) in the patch to assume the value: $P_{\delta,\theta}^\pm(x,y)=p^\pm(x-\delta-\theta y)$, where the parameter $\delta$ accounts for the shift of the pattern, while $\theta$ approximates its rotation, e.g., due to the lens radial distortion.

For each location x in the image, a patch P around it is used to estimate $\hat{\lambda}_a$ and $\hat{\lambda}_p$. While $\theta$ is treated as a nuisance parameter, the shift $\delta$ is actually estimated using maximum likelihood:

$$\hat{\delta}(x) = \arg\max_{\delta} \max_{\theta} \max \left\{ \sum_{x \in P} L(y(x) \mid P_{\delta,\theta}^-(x)), \sum_{x \in P} L(y(x) \mid P_{\delta,\theta}^+(x)) \right\}.$$

In practice, the likelihood is discretized on a grid of $\delta$ and $\theta$. If the rising edge template $P^+$ is selected and $\delta<0$, or the falling edge of template $P^-$ is selected and $\delta \geq 1$, the pixel is assigned the value of 0. Similarly, if the rising edge template $P^+$ is selected and $\delta>1$, or the falling edge template $P^-$ is selected and $\delta \leq 1$, the pixel is assigned the value of 0. Otherwise, if $\delta \in [0,1]$, a transition is signaled in the pixel x, and its sub-pixel location is encoded by $\hat{\delta}(x)$. Furthermore, the maximum value of the likelihood function serves as the confidence of the estimation.

Figure 5A:
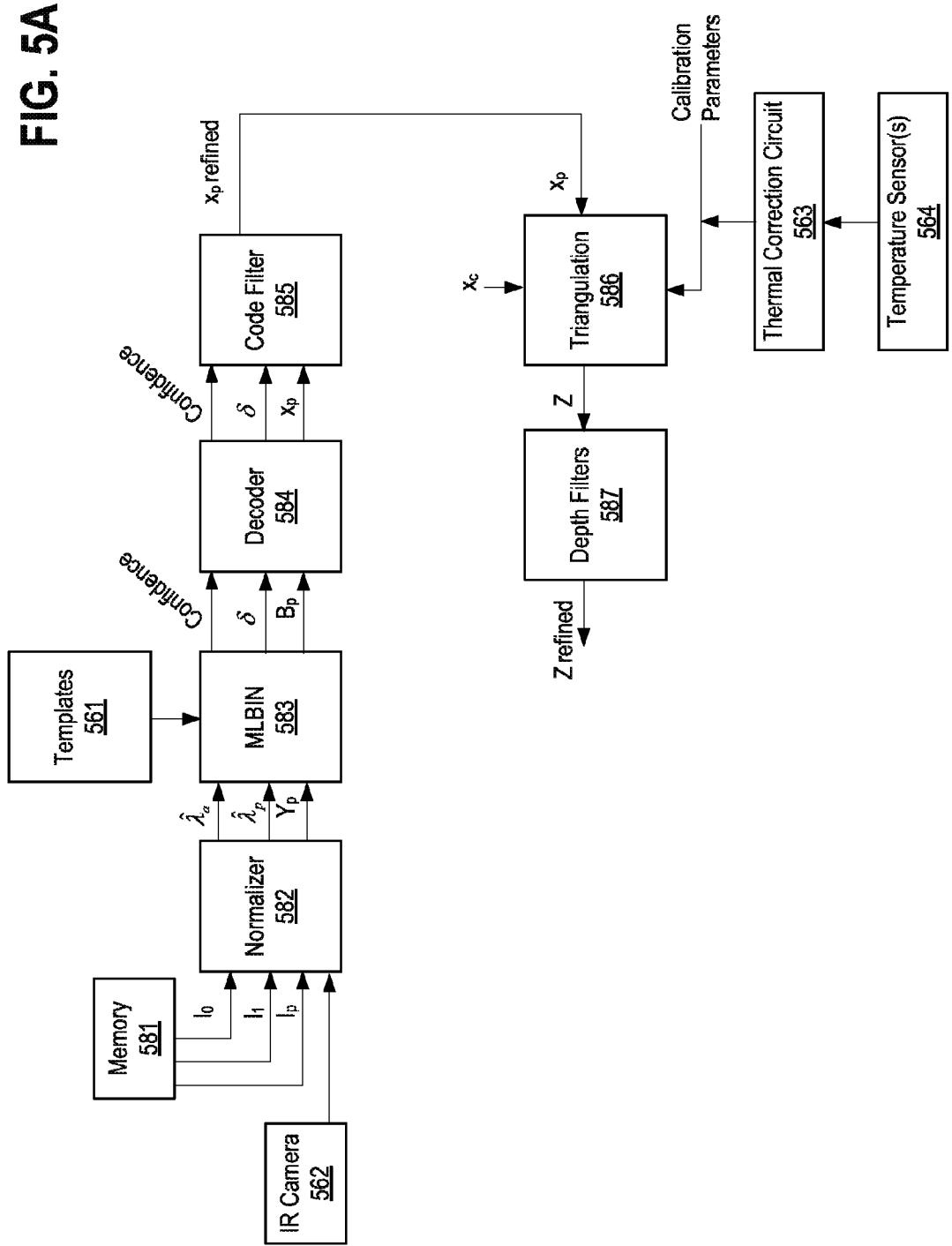
FIG. 5A depicts a flow diagram having exemplary architecture and circuitry in accordance with which embodiments may operate.

FIG. 5A depicts a flow diagram having exemplary architecture and circuitry in accordance with which embodiments may operate. Specifically depicted are memory 581 and IR camera 562, leading to normalizer 582 in which $I_0$ and $I_1$ denote the fully un-illuminated (dark) image and fully illuminated (white) images, respectively and $I_p$ is the image of the known projected pattern. Refer to the signal formation model above.

Templates 561 are depicted as an input to the Maximum Likelihood BINarizer (MLBIN) 583 as are $\hat{\lambda}_a$ and $\hat{\lambda}_p$ and $Y_p$ from the normalizer 582. MLBIN 583 provides confidence, parameter $\delta$ and $B_p$ to decoder 584. Decoder 584 provides confidence, parameter $\delta$ and $X_p$ to code filter 585 resulting in $X_p$ refined being passed to triangulation unit 586 which receives as inputs $X_p$ and $X_c$ as well as calibration parameters and temperature data from the thermal correction circuit 563 based on temperature sensor(s) 564. Triangulation 586 passes Z to depth filters 587 resulting in Z refined.

Figure 5B:
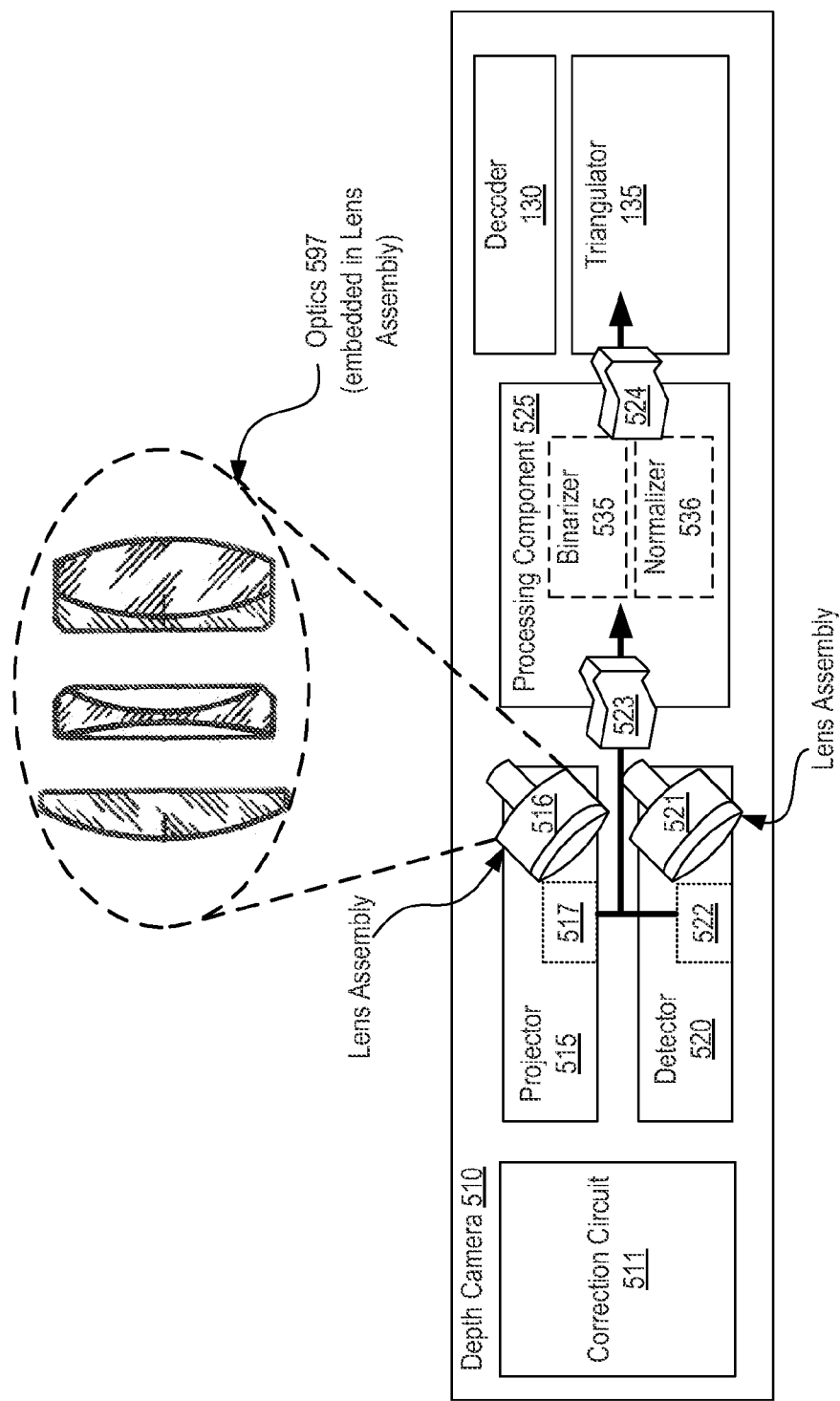
FIG. 5B illustrates another exemplary architecture in accordance with which embodiments may operate.

FIG. 5B illustrates another exemplary architecture in accordance with which embodiments may operate. In particular, depth camera 510 is depicted having specifically the projector 515 and detector 520 therein, as well as a lens assembly 516 and associated optics 597 of projector and a lens assembly 521 of detector 520. Binarizer 535 and normalizer 536 are again depicted, herein within the processing component 525. Also depicted are decoder 130 and triangulator 135.

In accordance with a particular embodiment, the depth camera 510 further includes a first temperature sensor 517 to measure a first temperature at the projector 515 and a second temperature sensor 522 to measure a second temperature at the detector 520. In such an embodiment, the processing component 525 is to receive the first and second temperatures 523 as an input to adjust calibration parameters 524 of the triangulator used to determine the position of the object in the scene, the adjustment to the calibration parameters 524 based on temperature dependent changes to optical 597, mechanical, and electronic components in the projector 515 and the detector 520.

In accordance with a particular embodiment, the depth camera implements corrections, sometimes referred to as "summer correction" to account for changes in temperature of the depth camera, of the components of the depth camera, of the operating conditions within which the depth camera functions, or some combination thereof. Calibration parameters 524 of the depth camera are affected by temperature and as such, changes in temperature may reduce the precision and accuracy of the depth camera due to physical changes in the optics, thus negatively affecting depth measurements performed by the depth camera. Therefore, the temperature sensors and temperature readings are utilized by the depth camera to adjust the calibration parameters utilized by the triangulator in performing the depth measurements and specifically used to determine the depth to a given object observed in the scene. Such changes affecting the optics of the depth camera may be no more than one part in a thousand, yet even very small discrepancies can be amplified over the distance to an object in the scene and as such, even very small corrections can improve the performance and accuracy of the depth camera.

In accordance with a particular embodiment, temperature sensors are embedded in a lens of the depth camera, such as within the projector lens assembly or the detector or camera lens assembly, and the depth camera receives temperature data from the lens assembly which is then utilized by the triangulator to adjust the calibration parameters. In accordance with another embodiment, temperature sensors are affixed to a printed circuit board near or co-located with the projector or the detector.

In accordance with a particular embodiment, a correction circuit 511 receives as input one or more temperatures measured via a corresponding one or more temperature sensors at or near the optics of the depth camera, such as the optics of the detector and projector, and the correction circuit 511 outputs either an adjustment to the calibration parameters utilized by the triangulator or outputs adjusted correction parameters for use by the triangulator. For instance, the adjustment circuit may apply a so-called summer correction to the calibration parameters which are then provided as an input to the triangulator.

Figure 6B:
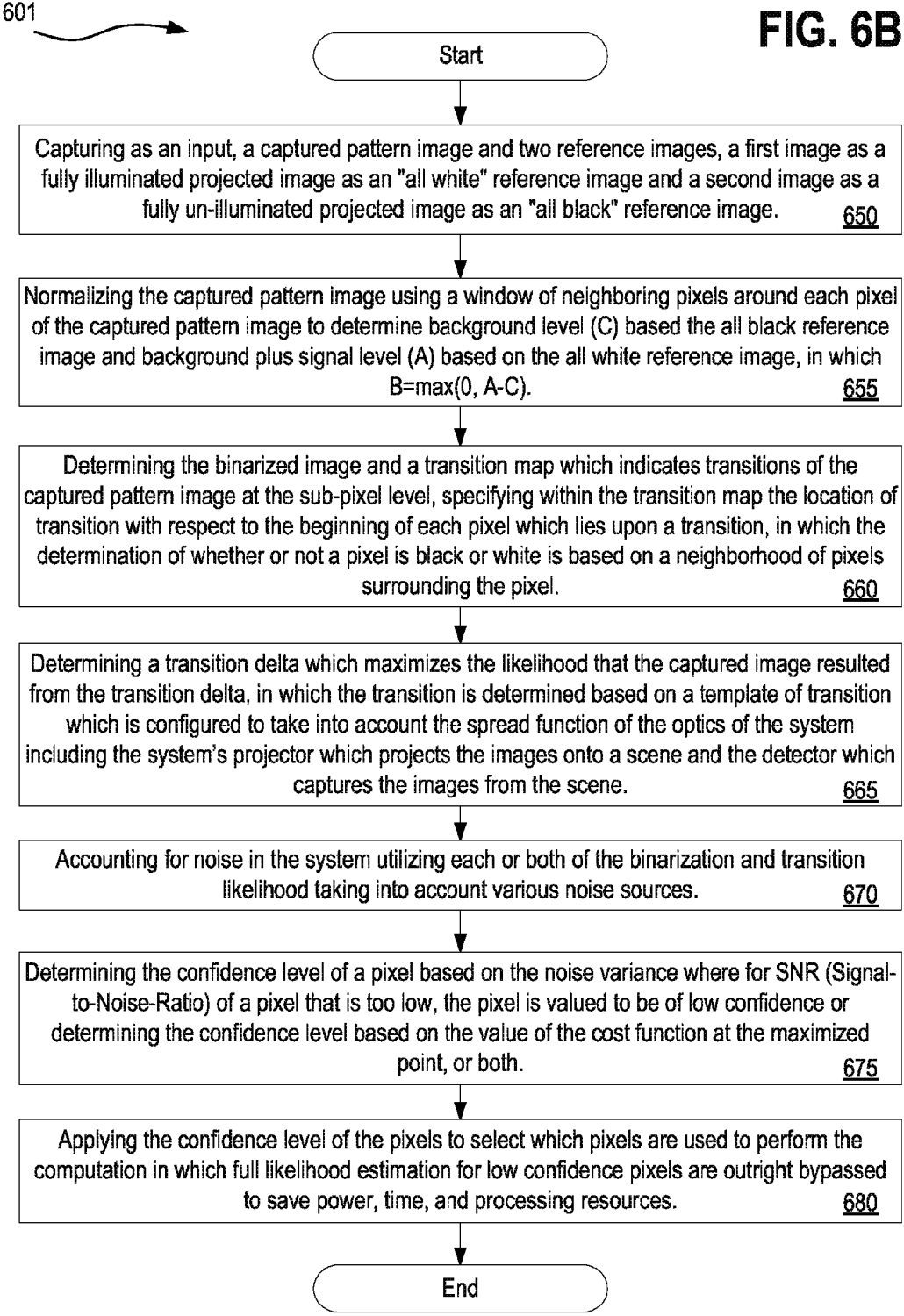
FIG. 6B is an alternative flow diagram illustrating a method for implementing maximum likelihood image binarization in a coded light range camera in accordance with the described embodiments.

FIG. 6A is a flow diagram illustrating a method 600 for implementing maximum likelihood image binarization in a coded light range camera in accordance with the described embodiments. FIG. 6B is an alternative flow diagram illustrating a method 601 for implementing maximum likelihood image binarization in a coded light range camera in accordance with the described embodiments.

Figure 7B:
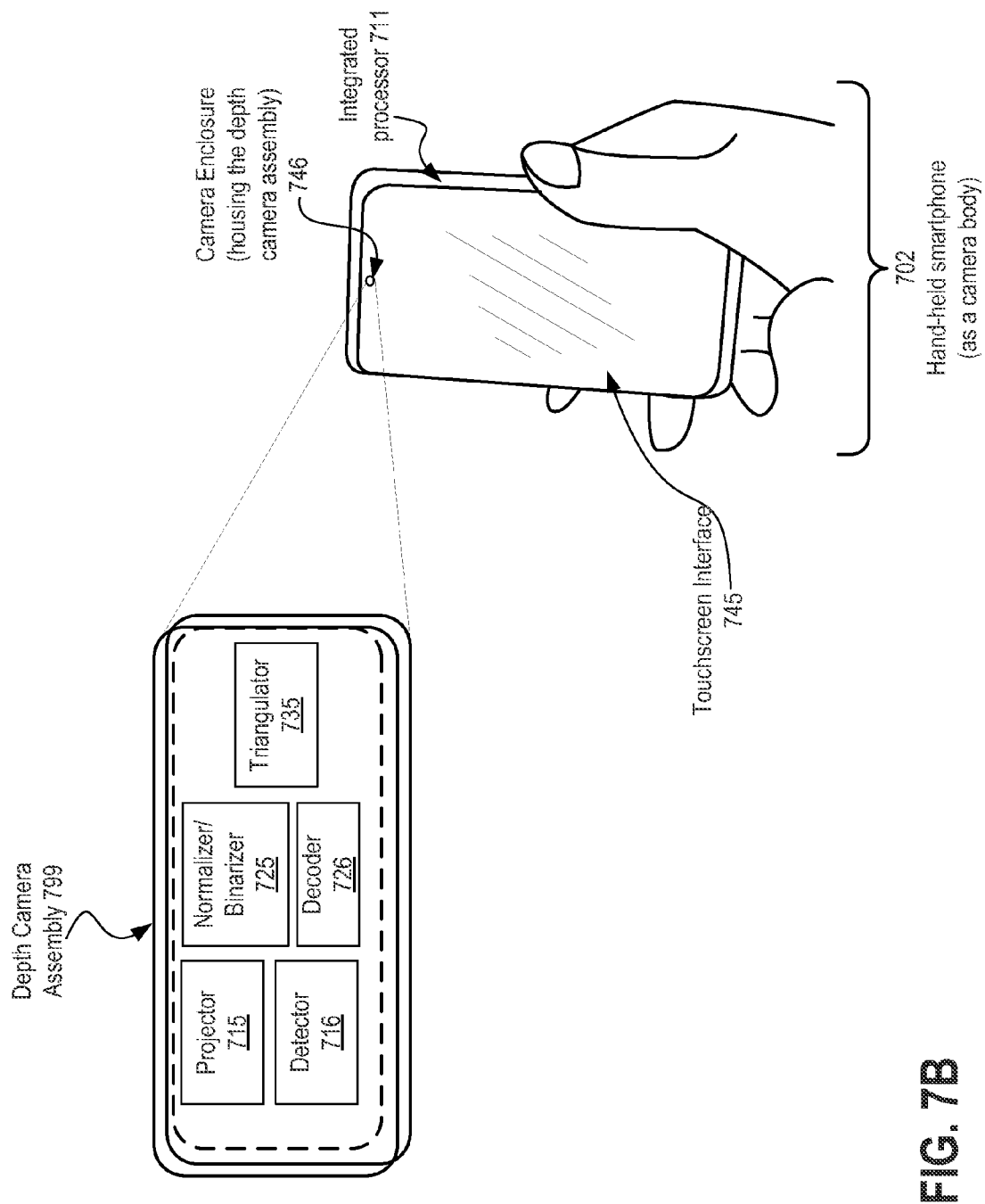
FIG. 7B illustrates an exemplary hand-held smartphone with a camera enclosure housing the depth camera assembly in accordance with described embodiments.
Figure 7C:
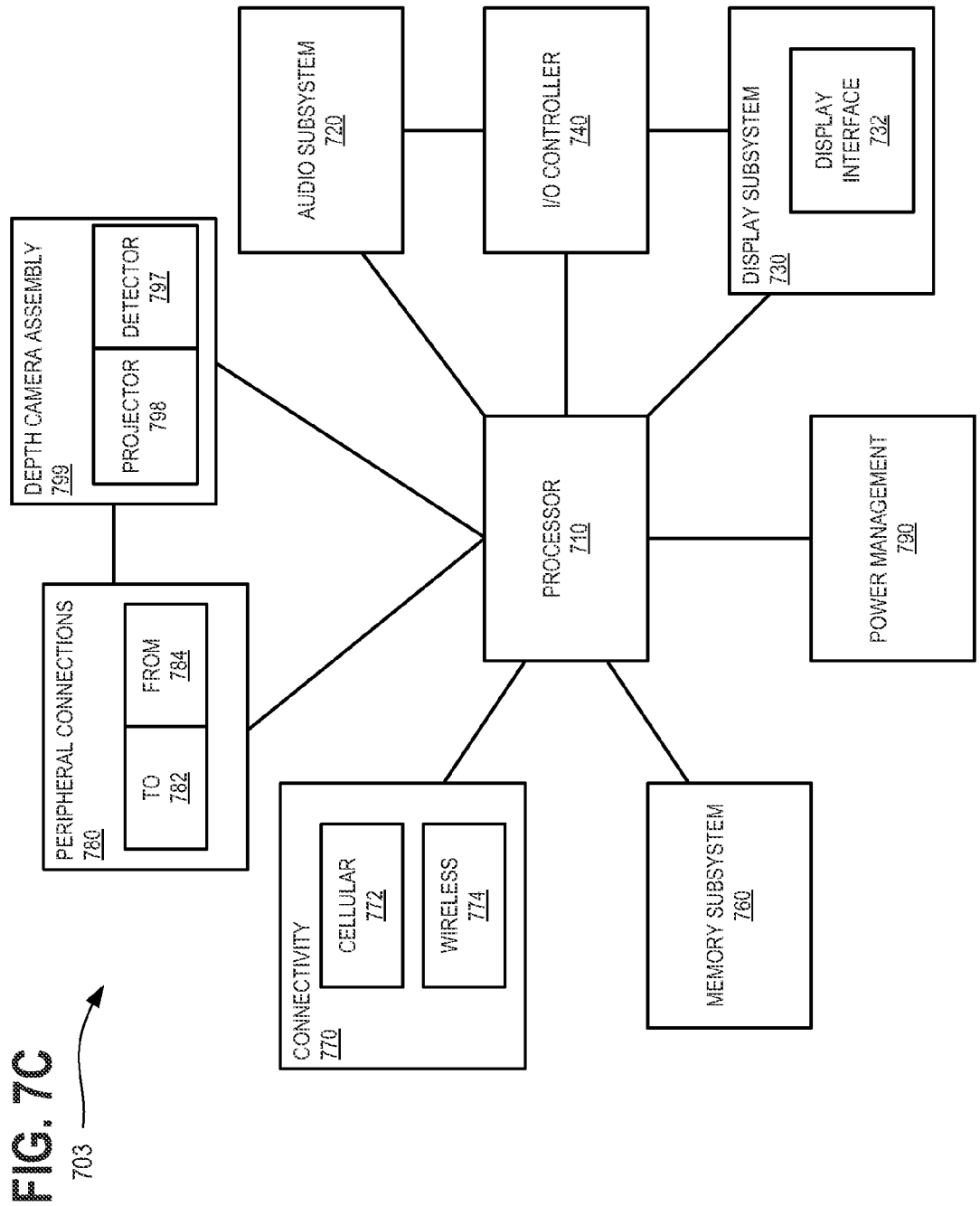
FIG. 7C is a block diagram of an embodiment of tablet computing device, a smart phone, or other mobile device in which touchscreen interface connectors are used.

Some of the blocks and/or operations listed below for methods 600 and 601 are optional in accordance with certain embodiments. The numbering of the blocks presented is for the sake of clarity and is not intended to prescribe an order of operations in which the various blocks must occur. Methods 600 and 601 may be performed by processing logic that may include hardware (e.g., circuitry, dedicated logic, programmable logic, microcode, etc.), software (e.g., instructions run on a processing device) to perform various operations such as projecting, capturing, adjusting, outputting, decoding, triangulating, normalizing, binarizing, controlling, analyzing, collecting, monitoring, executing, presenting, interfacing, receiving, processing, determining, triggering, displaying, etc., in pursuance of the systems and methods as described herein. For example, depth cameras 110, 210, 310, 410, and 510 as depicted at FIGS. 1 through 5, the smart phone or tablet computing devices as depicted at FIGS. 7A, 7B, and 7C, or the machine 800 at FIG. 8, may implement the described methodologies.

With reference first to method 600 of FIG. 6A, operations begins at block 605 with processing logic for projecting via a projector, a collection of planes, each at a different angle of projection, onto a scene via a plurality of coded pattern images, each of the coded pattern images having encoded therein via a plurality of stripes, the angle of projection for the plane of projection within which the respective coded pattern image is projected.

At block 610, processing logic captures, via a detector, the plurality of coded pattern images from the scene.

At block 615, processing logic adjusts for ambient illumination and reflection properties of the scene via a processing component of the depth camera.

At block 620, processing logic outputs from the processing component a bit value for each pixel in the captured plurality of coded pattern images and outputting a sub-pixel offset for the pixels positioned upon transitions of the plurality of stripes in the captured plurality of coded pattern images.

At block 625, processing logic decodes each of the plurality of coded pattern images and adjusting the decoded plurality of coded image patterns based on the sub-pixel offsets to determine the angle of projection for the corresponding plane of projection.

At block 630, processing logic triangulates a position of an object in the scene based on an intersection of the determined angle of projection for the corresponding plane of projection with a geometric ray originating from the detector that captured the plurality of the coded pattern images from the scene.

In accordance with a particular embodiment of method 600, the processing component includes a binarizer and the method further determines a binary value for each pixel captured by the detector within the plurality of coded pattern images and output the bit value for each pixel. In such an embodiment, the method still further determines a pixel shift for each pixel having a transition from 0 to 1 or 1 to 0 in the plurality of coded pattern images, the pixel shift representing a shift relative to a center of the pixel having the transition output the sub-pixel offset for the pixels positioned upon transitions of the plurality of stripes in the captured plurality of coded pattern images; and provides the binary value for each pixel and the determined pixel shifts as an input to a decoder.

Further optional processing may take place to normalize the image, binarize the image, implement temperature sensitive summer corrections for the image, and so forth, consistent with the embodiments as are described herein.

In accordance with another embodiment there is a non-transitory computer readable storage medium having instructions stored thereupon that, when executed by a processor of a depth camera, the instructions cause the depth camera to perform operations including: projecting a collection of planes, each at a different angle of projection, onto a scene via a plurality of coded pattern images, each of the coded pattern images having encoded therein via a plurality of stripes, the angle of projection for the plane of projection within which the respective coded pattern image is projected; capturing the plurality of coded pattern images from the scene; adjusting for ambient illumination and reflection properties of the scene via a processing component of the depth camera; outputting from the processing component a bit value for each pixel in the captured plurality of coded pattern images and outputting a sub-pixel offset for the pixels positioned upon transitions of the plurality of stripes in the captured plurality of coded pattern images; decoding each of the plurality of coded pattern images and adjusting the decoded plurality of coded image patterns based on the sub-pixel offsets to determine the angle of projection for the corresponding plane of projection; and triangulating a position of an object in the scene based on an intersection of the determined angle of projection for the corresponding plane of projection with a geometric ray originating from the detector that captured the plurality of the coded pattern images from the scene.

With reference now to method 601 of FIG. 6B, operations begins at block 650 with processing logic capturing as an input, a captured pattern image and two reference images, a first image as a fully illuminated projected image as an "all white" reference image and a second image as a fully un-illuminated projected image as an "all black" reference image.

At block 655, processing logic normalizes the captured pattern image using a window of neighboring pixels around each pixel of the captured pattern image to determine background level (C) based the all black reference image and background plus signal level (A) based on the all white reference image, in which B=max(0, A-C).

At block 660, processing logic determines the binarized image and a transition map which indicates transitions of the captured pattern image at the sub-pixel level, specifying within the transition map the location of transition with respect to the beginning of each pixel which lies upon a transition, in which the determination of whether or not a pixel is black or white is based on a neighborhood of pixels surrounding the pixel.

At block 665, processing logic determines a transition delta which maximizes the likelihood that the captured image resulted from the transition delta, in which the transition is determined based on a template of transition which is configured to take into account the spread function of the optics of the system including the system's projector which projects the images onto a scene and the detector which captures the images from the scene.

At block 670, processing logic accounts for noise in the system utilizing each or both of the binarization and transition likelihood taking into account various noise sources.

At block 675, processing logic determines the confidence level of a pixel based on the noise variance where for SNR (Signal-to-Noise-Ratio) of a pixel that is too low, the pixel is valued to be of low confidence or determining the confidence level based on the value of the cost function at the maximized point, or both.

At block 680, processing logic applies the confidence level of the pixels to select which pixels are used to perform the computation in which full likelihood estimation for low confidence pixels are outright bypassed to save power, time, and processing resources. For instance, any pixel having a confidence at or below a pre-determined threshold may be deemed too low of confidence, and as such, not used in the computation.

FIG. 7A illustrates an exemplary tablet computing device 701 with a camera enclosure 746 housing the depth camera assembly 799 in accordance with described embodiments. FIG. 7B illustrates an exemplary hand-held smartphone 702 with a camera enclosure 746 housing the depth camera assembly 799 in accordance with described embodiments.

For instance, according to the described embodiments, the depth camera assembly 799 having the necessary optics (e.g., lenses) of the projector 715, detector 716, as well as the normalizer/binarizer 725, decoder 726, and triangulator 735 therein, as described previously, is integrated within a hand-held smartphone 702 or tablet computing device 701 as a camera body for the depth camera assembly 799.

In accordance with one embodiment, the hand held smartphone 702 or tablet computing device 701 having a touch-screen interface 745 integrated therein forms the camera body to which the depth camera assembly 799 is integrated or installed.

FIGS. 7A and 7B depict the tablet computing device 701 and the hand-held smartphone 702 each having a circuitry integrated therein as described in accordance with the embodiments. As depicted, each of the tablet computing device 701 and the hand-held smartphone 702 include a touchscreen interface 745 and an integrated processor 711 in accordance with disclosed embodiments.

For example, in one embodiment, a tablet computing device 701 or a hand-held smartphone 702, includes a display unit which includes a touchscreen interface 745 for the tablet or the smartphone and further in which memory and an integrated circuit operating as an integrated processor are incorporated into the tablet or smartphone, in which the integrated processor is operable in conjunction with the depth camera assembly 799 and its components and circuitry as described herein; the tablet or smartphone and its processing components being further operable to perform image projection, image capture and image processing including adjustments and triangulation to determine depth information to an object of a scene. In one embodiment, the integrated circuit described above or the depicted integrated processor of the tablet or smartphone is an integrated silicon processor functioning as a central processing unit (CPU) and/or a Graphics Processing Unit (GPU) for a tablet computing device or a smartphone.

FIG. 7C is a block diagram 703 of an embodiment of tablet computing device, a smart phone, or other mobile device in which touchscreen interface connectors are used.

Processor 710 performs the primary processing operations. Audio subsystem 720 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 710.

Depth camera assembly 799 is depicted as communicably interfaced to the processor 710 and peripheral connections 780. Depth camera assembly 799 includes the projector 798 and detector 797.

Display subsystem 730 represents hardware (e.g., display devices) and software (e.g., drivers) components that provide a visual and/or tactile display for a user to interact with the tablet computing device or smart phone. Display subsystem 730 includes display interface 732, which includes the particular screen or hardware device used to provide a display to a user. In one embodiment, display subsystem 730 includes a touchscreen device that provides both output and input to a user.

I/O controller 740 represents hardware devices and software components related to interaction with a user. I/O controller 740 can operate to manage hardware that is part of an audio subsystem 720 and/or display subsystem 730. Additionally, I/O controller 740 illustrates a connection point for additional devices that connect to the tablet computing device or smart phone through which a user might interact. In one embodiment, I/O controller 740 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 790 that manages battery power usage, charging of the battery, and features related to power saving operation. Memory subsystem 760 includes memory devices for storing information in the tablet computing device or smart phone. Connectivity 770 includes hardware devices (e.g., wireless and/or wired connectors and communication hardware) and software components (e.g., drivers, protocol stacks) to the tablet computing device or smart phone to communicate with external devices. Cellular connectivity 772 may include, for example, wireless carriers such as GSM (global system for mobile communications), CDMA (code division multiple access), TDM (time division multiplexing), or other cellular service standards). Wireless connectivity 774 may include, for example, activity that is not cellular, such as personal area networks (e.g., Bluetooth), local area networks (e.g., WiFi), and/or wide area networks (e.g., WiMax), or other wireless communication.

Peripheral connections 780 include hardware interfaces and connectors, as well as software components (e.g., drivers, protocol stacks) to make peripheral connections as a peripheral device ("to" 782) to other computing devices, as well as have peripheral devices ("from" 784) connected to the tablet computing device or smart phone, including, for example, a "docking" connector to connect with other computing devices. Peripheral connections 780 include common or standards-based connectors, such as a Universal Serial Bus (USB) connector, DisplayPort including MiniDisplayPort (MDP), High Definition Multimedia Interface (HDMI), Firewire, etc.

FIG. 8 illustrates a diagrammatic representation of a machine 800 in the exemplary form of a computer system, in accordance with one embodiment, within which a set of instructions, for causing the machine/computer system 800 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein including implementing maximum likelihood image binarization in a coded light range camera.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and a persistent database and/or a multi-tenant database implementation), which communicate with each other via a bus 830. Main memory 804 includes software 822 and an depth processing 824 functionality which is interfaced with the triangulation circuit 823 capable of performing triangulation processing without the need for correspondence calculation amongst a set of multiple images captured. Main memory 804 and its sub-elements are operable in conjunction with processing logic 826 and processor 802 to perform the methodologies discussed herein.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and functionality which is discussed herein including interfacing to the depth camera and/or performing processing on behalf of such a depth camera.

The computer system 800 may further include a network interface card 808. The computer system 800 also may include a user interface 810 (such as a video display unit, a liquid crystal display (LCD), touch screen, or a cathode ray tube (CRT)), an alphanumeric input device 812 (e.g., a keyboard), a cursor control device 814 (e.g., a mouse), and a signal generation device such as an integrated speaker 816. The computer system 800 may further include peripheral device 836 (e.g., wireless or wired communication devices, memory devices, storage devices, audio processing devices, video processing devices, etc.).

The secondary memory 818 may include a non-transitory machine-accessible or computer readable storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface card 808.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A depth camera comprising:
    a projector to project a collection of planes, each at a different angle of projection, onto a scene via a plurality of coded pattern images, each of the coded pattern images having encoded therein via a plurality of stripes, the angle of projection for the plane of projection within which the respective coded pattern image is projected;
    a detector to capture the plurality of coded pattern images from the scene;
    a processing component to output a bit value for each pixel in the captured plurality of coded pattern images based on the pixel captured and based further on a patch of neighboring pixels surrounding the pixel, wherein the processing component comprises a binarizer to output the bit value for each pixel in the captured plurality of coded pattern images, wherein the binarizer is to
        output the bit value for each pixel in the captured plurality of coded pattern images, and
        determine the bit value of each pixel based on the patch of neighboring pixels surrounding the pixel by a selection of one of a plurality of patch templates that matches the patch of neighboring pixels;
    a decoder to decode each of the plurality of coded pattern images based on the bit values output by the processing component to determine the angle of projection for the corresponding plane of projection; and
    a triangulator to determine a position of an object in the scene based on an intersection of the determined angle of projection for the corresponding plane of projection with a geometric ray originating from the detector that detected the plurality of the coded pattern images.

2. The depth camera of claim 1: wherein the selection of one of a plurality of patch templates which matches the patch of neighboring pixels comprises a selection by the binarizer of the one of the plurality of patch templates which corresponds to an increased resilience to noise; and wherein the binarizer to output the bit value comprises the binarizer to output the bit value for each and every pixel in the captured plurality of coded image patterns based on the selected one patch template for the respective pixel of the captured plurality of coded image patterns.

3. The depth camera of claim 1, wherein the processing component is to perform a Maximum Likelihood Estimation to adjust for inaccuracies in the projected collection of planes onto the scene via the plurality of coded pattern images.

4. The depth camera of claim 3, wherein the processing component comprises a Maximum Likelihood (ML) Binarizer to output the bit value for each pixel x in the captured plurality of coded pattern images;
wherein the ML Binarizer is to determine likelihood values for each of the pixels in the captured plurality of coded pattern images based at least in part on the patch of neighboring pixels surrounding the respective pixel x;
wherein the ML Binarizer is to assume each of the projected plurality of coded pattern images is a one-dimensional code expressed by two one-dimensional functions $p^{\pm}(x)$ with transitions for rising and falling edges respectively of the pixel x located exactly at x=0;
wherein the ML Binarizer is to form a parametric family of two-dimensional templates by letting for each pixel x=(x,y) in the patch to assume the value:
$P_{\delta,\theta}^{\pm}(x, y)=p^{\pm}(x\delta-\theta y)$, where parameter $\delta$ accounts for a shift of the respective coded pattern image and where $\theta$ approximates rotation of the respective coded pattern image due to lens radial distortion.

5. The depth camera of claim 4, wherein the ML Binarizer to determine the likelihood values comprises the likelihood discretized on a grid of $\delta$ and $\theta$ by the ML Binarizer;
wherein, if the rising edge template $P^+$ is selected and $\delta<0$ or if the falling edge of template $P^-$ is selected and $\delta\geq1$, then the pixel x is assigned a value of 0;
wherein, if the rising edge template $P^+$ is selected and $\delta>1$ or the falling edge template $P^-$ is selected and $\delta\leq1$, then the pixel x is assigned the value of 0;
else, if $\delta\in[0,1]$, then a transition is signaled in the pixel x, and a sub-pixel location of pixel x is encoded by an optimal value of $\hat{\delta}(x)$; and
wherein a maximum value of the determined likelihood by the performed Maximum Likelihood Estimation function serves as a confidence of the estimation.

6. The depth camera of claim 1:
wherein the processing component is to determine likelihood values for each of the pixels in the captured plurality of coded pattern images based at least in part on the patch of neighboring pixels surrounding the respective pixel; and
wherein the processing component is to compute the confidence of each pixel based on the determined likelihood values for each of the respective pixels.

7. The depth camera of claim 6:
wherein the decoder is to further aggregate the confidence values of the pixels across each of a plurality of bit planes within the collection of planes projected by the projector at the different angles of projection; and wherein the decoder to decode each of the plurality of coded pattern images comprises the decoder to decode the plurality of coded pattern images based further on the aggregated confidence values of each of the pixels across the plurality of bit planes.

8. The depth camera of claim 1, wherein the processing component comprises a normalizer to adjust for ambient illumination and reflection properties of the scene.

9. The depth camera of claim 8, wherein the normalizer to adjust for the ambient illumination and reflection properties of the scene comprises the normalizer to estimate values of an ambient signal and signal amplitude for each pixel based on the patch of neighboring pixels surrounding the pixel.

10. The depth camera of claim 9:
wherein the normalizer to estimate values of the ambient signal and the signal amplitude comprises the normalizer to estimate the values of the ambient signal $\lambda_a$, and the signal amplitude $\lambda_p$ for each pixel based on the patch of neighboring pixels surrounding the pixel x;
wherein each of $\lambda_a$ and $\lambda_p$ are assumed to be constant in the patch P around x; and
wherein the normalizer is to estimate the ambient signal $\lambda_a$ and the signal amplitude $\lambda_p$ by averaging the pixels in a patch around x in un-illuminated and fully illuminated reference images.

11. The depth camera of claim 1:
wherein the processing component comprises a binarizer to output the bit value for each pixel in the captured plurality of coded pattern images; and
wherein the binarizer is to select, for each pixel x, one of the plurality of patch templates P(x) which matches the patch of neighboring pixels y(x) based on which of the patch templates provides a greatest degree of accuracy or a determined accuracy over a pre-determined threshold or a determined improvement in noise over a threshold.

12. The depth camera of claim 1, wherein the processing component comprises a binarizer to output the bit value for each pixel in the captured plurality of coded pattern images;
wherein the binarizer is to compute a sum of the squared differences based on a difference between the pixels in each patch in the plurality of coded pattern images captured from the scene and the pixels in each of the plurality of template patches, wherein terms of the sum of the squared differences are weighted based on signal strength to identify which one of a plurality of templates matches a patch of neighboring pixels with a greatest degree of accuracy; and
wherein the binarizer outputs the bit value for each pixel in the captured plurality of coded image patterns based on the selected one patch template for the pixel.

13. The depth camera of claim 1, wherein the processing component comprises a binarizer to output the bit value for each pixel x in the captured plurality of coded pattern images;
wherein the binarizer is to compute a sum of the squared differences based on a difference between the pixels in each patch in the plurality of coded pattern images captured from the scene and the pixels in each of the plurality of patch templates P, $$\sum_{x\in P} w(x)(\hat{\lambda}_p P(x) - y(x))^2,$$

where $\lambda_p$ is an estimate of signal amplitude, and wherein terms of the sum of the squared differences are weighted by weights w(x) based on signal strength to identify which one of a plurality of patch templates P matches a patch of neighboring pixels with a greatest degree of accuracy; and wherein the binarizer further is to output the bit value for each pixel in the captured plurality of coded image patterns based on the identified one patch template for the pixel having the greatest degree of accuracy.

14. The depth camera of claim 1:
wherein the projector comprises an infrared projector to project the collection of planes onto the scene in an infrared light range;
wherein the detector comprises an infrared camera to capture the plurality of coded pattern images from the scene in the infrared light range; and
wherein the depth camera further comprises an RGB (Red, Green, Blue) camera to capture RGB images of the scene in a visible light range.

15. The depth camera of claim 1, further comprising:
a first temperature sensor to measure a first temperature at the projector;
a second temperature sensor to measure a second temperature at the detector; and
wherein the processing component to receive the first and second temperatures as an input to adjust calibration parameters of the triangulator used to determine the position of the object in the scene, the adjustment to the calibration parameters based on temperature dependent changes to optical, mechanical, and electronic components in the projector and the detector.

16. The depth camera of claim 1, wherein the triangulator to determine the position of the object in the scene comprises the triangulator to determine the position of the object in the scene without computing correspondence between the plurality of coded pattern images projected onto the scene by the projector and the plurality of coded pattern images captured from the scene by the detector.

17. A method in a depth camera, wherein the method comprises:
projecting via a projector, a collection of planes, each at a different angle of projection, onto a scene via a plurality of coded pattern images, each of the coded pattern images having encoded therein via a plurality of stripes, the angle of projection for the plane of projection within which the respective coded pattern image is projected;
capturing, via a detector, the plurality of coded pattern images from the scene;
outputting, from a processing component of the depth camera, a bit value for each pixel in the captured plurality of coded pattern images based on the pixel captured and based further on a patch of neighboring pixels surrounding the pixel, wherein outputting the bit value for each pixel comprises using a binarizer implemented by the processing component to output the bit value for each pixel in the captured plurality of coded pattern images, including
selecting, via the binarizer, one of a plurality of patch templates which matches the patch of neighboring pixels to determine the bit value of each pixel based on the patch of neighboring pixels surrounding the pixel, and
outputting from the binarizer the bit value for each and every pixel in the captured plurality of coded image patterns based on the selected one patch template for the respective pixel of the captured plurality of coded image patterns;
decoding each of the plurality of coded pattern images based on the bit values output by the processing component to determine the angle of projection for the corresponding plane of projection; and
triangulating a position of an object in the scene based on an intersection of the determined angle of projection for the corresponding plane of projection with a geometric ray originating from the detector that detected the plurality of the coded pattern images from the scene.

18. Non-transitory computer readable storage media having instructions stored thereupon that, when executed by a processor of a depth camera, the instructions cause the depth camera to perform operations comprising:
projecting via a projector, a collection of planes, each at a different angle of projection, onto a scene via a plurality of coded pattern images, each of the coded pattern images having encoded therein via a plurality of stripes, the angle of projection for the plane of projection within which the respective coded pattern image is projected;
capturing, via a detector, the plurality of coded pattern images from the scene;
outputting, from a processing component of the depth camera, a bit value for each pixel in the captured plurality of coded pattern images based on the pixel captured and based further on a patch of neighboring pixels surrounding the pixel, wherein outputting the bit value for each pixel comprises using a binarizer implemented by the processing component to output the bit value for each pixel in the captured plurality of coded pattern images, including
selecting, via the binarizer, one of a plurality of patch templates that matches the patch of neighboring pixels to determine the bit value of each pixel based on the patch of neighboring pixels surrounding the pixel, and
outputting from the binarizer the bit value for each and every pixel in the captured plurality of coded image patterns based on the selected one patch template for the respective pixel of the captured plurality of coded image patterns;
decoding each of the plurality of coded pattern images based on the bit values output by the processing component to determine the angle of projection for the corresponding plane of projection; and
triangulating a position of an object in the scene based on an intersection of the determined angle of projection for the corresponding plane of projection with a geometric ray originating from the detector that detected the plurality of the coded pattern images from the scene.

* * * * *